US012637286B2

(12) United States Patent
Heggebø

(10) Patent No.: US 12,637,286 B2
(45) Date of Patent: May 26, 2026

(54) AUTOMATED STORAGE AND RETRIEVAL SYSTEM WITH A DYNAMIC STORAGE SECTION AND A METHOD OF USING SAME

(71) Applicant: Autostore Technology AS, Nedre Vats (NO)

(72) Inventor: Jørgen Djuve Heggebø, Langhus (NO)

(73) Assignee: AutoStore Technology AS, Nedre Vats (NO)

( * ) Notice: Subject to any disclaimer, the term of this patent is extended or adjusted under 35 U.S.C. 154(b) by 339 days.

(21) Appl. No.: 18/564,954

(22) PCT Filed: May 24, 2022

(86) PCT No.: PCT/EP2022/064013
§ 371 (c)(1),
(2) Date: Nov. 28, 2023

(87) PCT Pub. No.: WO2022/248451
PCT Pub. Date: Dec. 1, 2022

(65) Prior Publication Data
US 2024/0286833 A1      Aug. 29, 2024

(30) Foreign Application Priority Data

May 28, 2021    (NO) ................................... 20210679

(51) Int. Cl.
*B65G 1/04*        (2006.01)
*B65G 1/06*        (2006.01)
*B65G 1/10*        (2006.01)
(52) U.S. Cl.
CPC ........... *B65G 1/0464* (2013.01); *B65G 1/065* (2013.01); *B65G 1/10* (2013.01)
(58) Field of Classification Search
CPC ........ B65G 1/0464; B65G 1/065; B65G 1/10; B65G 2201/0258; B65G 1/04;
(Continued)

(56) References Cited

U.S. PATENT DOCUMENTS 4,568,233 A * 2/1986 Baker ................. B65G 1/0464
                                                              414/561
4,923,354 A 5/1990 Giuliano et al.
(Continued)

FOREIGN PATENT DOCUMENTS

CN        105059811 A      11/2015
CN        110949918 A       4/2020
(Continued)

OTHER PUBLICATIONS

International Search Report issued in PCT/EP2022/064013 on Sep. 16, 2022 (6 pages).
(Continued)

*Primary Examiner* — Garcia Ade
(74) *Attorney, Agent, or Firm* — Baker Botts L.L.P.

(57)                ABSTRACT

An automated storage and retrieval system including a rail system and a storage section located beneath or above the rail system. The storage section includes a plurality of storage towers for storing goods holders and movement in at least one of a first direction and a second direction. Additionally, the storage section includes at least one column void defined by a space between two or more of the plurality of storage towers. The at least one column void includes a footprint corresponding to an area of at least one cell. Further, the at least one column void may be repositioned within the storage section in at least one of the first direction and the second direction into vertical alignment with different access openings at varying locations via movement in at least one of the first direction and the second direction of at least one of the plurality of storage towers.

20 Claims, 14 Drawing Sheets

(58) Field of Classification Search
CPC .. B65G 1/0414; B65G 1/0457; B65G 1/0492; B65G 1/06; B65G 1/137
See application file for complete search history.

(56) References Cited

U.S. PATENT DOCUMENTS

| | | | |
|---|---|---|---|
| 5,156,514 A | 10/1992 | Zah | |
| 2020/0148470 A1* | 5/2020 | Austrheim | B65G 1/0464 |
| 2022/0281683 A1 | 9/2022 | Huang et al. | |
| 2025/0289481 A1* | 9/2025 | Austrheim | B65G 1/0485 |

FOREIGN PATENT DOCUMENTS

| | | |
|---|---|---|
| CN | 111762482 A | 10/2020 |
| DE | 102009017241 A1 | 10/2010 |
| EP | 3715284 A1 | 9/2020 |
| GB | 1296443 A | 11/1972 |
| JP | S529271 A | 1/1977 |
| NO | 317366 B1 | 10/2004 |
| WO | 2014/075937 A1 | 5/2014 |
| WO | 2014/090684 A1 | 6/2014 |
| WO | 2015/193278 A1 | 12/2015 |
| WO | 2016/166294 A1 | 10/2016 |
| WO | 2016166354 A1 | 10/2016 |
| WO | WO-2016198565 A1 * | 12/2016 .......... B65G 1/0478 |
| WO | 2018/146304 A1 | 8/2018 |
| WO | 2019/206487 A1 | 10/2019 |
| WO | 2020/210558 A1 | 10/2020 |

OTHER PUBLICATIONS

Written Opinion of the International Searching Authority issued in PCT/EP2022/064013 on Sep. 16, 2022 (11 pages).
Norwegian Search Report issued in No. 20210679 mailed on Dec. 23, 2021 (3 pages).
Li, Li, Examining action in Chinese patent application 202280046946. 4, mailed Nov. 24, 2025, 17 pages, pub. by The State Intellectual Property Office of the People's Republic of China, Beijing, China.
Waldstein, Martin, Examining communication in European Patent Office patent application 22730442.5, mailed Dec. 4, 2025, 6 pages, pub. by European Patent Office, Munich, Germany.
Rognan, Tove Kathrine, Office Action in Norwegian U.S. Appl. No. 20/210,679, mailed Feb. 18, 2026, 6 pages, Norwegian Industrial Property Office, Oslo, Norway.

* cited by examiner 201a
201
201c
201b

X
Y
Z 301
304
301a
301c
301b

Y
X
Z

AUTOMATED STORAGE AND RETRIEVAL SYSTEM WITH A DYNAMIC STORAGE SECTION AND A METHOD OF USING SAME

FIELD OF THE INVENTION

The present invention relates to an automated storage and retrieval system for storage and retrieval of containers, in particular to an automated storage and retrieval system with a dynamic storage grid.

BACKGROUND AND PRIOR ART

FIG. 1 discloses a prior art automated storage and retrieval system 1 with a framework structure 100 and FIGS. 2, 3 and 4 disclose three different prior art container handling vehicles 201,301,401 suitable for operating on such a system 1.

The framework structure 100 comprises upright members 102 and a storage volume comprising storage columns 105 arranged in rows between the upright members 102. In these storage columns 105 storage containers 106, also known as bins, are stacked one on top of one another to form stacks 107. The members 102 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301,401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301,401 in a first direction X across the top of the frame structure 100, and a second set of parallel rails 111 arranged perpendicular to the first set of rails 110 to guide movement of the container handling vehicles 201,301,401 in a second direction Y which is perpendicular to the first direction X. Containers 106 stored in the columns 105 are accessed by the container handling vehicles 201,301,401 through access openings 112 in the rail system 108. The container handling vehicles 201,301,401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supporting.

Each prior art container handling vehicle 201,301,401 comprises a vehicle body 201a,301a,401a and first and second sets of wheels 201b,201c,301b,301c,401b,401c which enable the lateral movement of the container handling vehicles 201,301,401 in the X direction and in the Y direction, respectively. In FIGS. 2, 3 and 4 two wheels in each set are fully visible. The first set of wheels 201b,301b, 401b is arranged to engage with two adjacent rails of the first set 110 of rails, and the second set of wheels 201c,301c,401c is arranged to engage with two adjacent rails of the second set 111 of rails. At least one of the sets of wheels 201b, 201c,301b,301c,401b,401c can be lifted and lowered, so that the first set of wheels 201b,301b,401b and/or the second set of wheels 201c,301c,401c can be engaged with the respective set of rails 110, 111 at any one time.

Each prior art container handling vehicle 201,301,401 also comprises a lifting device for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301,401 so that the position of the gripping/engaging devices with respect to the vehicle 201,301,401 can be adjusted in a third direction Z which is orthogonal the first direction X and the second direction Y. Parts of the gripping devices of the container handling vehicles 301,401 are shown in FIGS. 3 and 4, indicated with reference number 304,404. The gripping device of the container handling vehicle 201 is located within the vehicle body 201a in FIG. 2 and is thus not shown.

Conventionally, and also for the purpose of this application, Z=1 identifies the uppermost layer available for storage containers below the rails 110,111, i.e. the layer immediately below the rail system 108, Z=2 the second layer below the rail system 108, Z=3 the third layer etc. In the exemplary prior art disclosed in FIG. 1, Z=7 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=17, Y=1, Z=5. The container handling vehicles 201,301,401 can be said to travel in layer Z=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201,301,401 comprises a storage compartment or space for receiving and stowing a storage container 106 when transporting the storage container 106 across the rail system 108. The storage space may comprise a cavity arranged internally within the vehicle body 201a,401a as shown in FIGS. 2 and 4 and as described in e.g. WO2015/193278A1 and WO2019/206487A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The cavity container handling vehicle 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the cavity container handling vehicles 401 may have a footprint which is larger than the lateral area defined by a storage column 105 as shown in FIGS. 1 and 4, e.g. as is disclosed in WO2014/090684A1 or WO2019/206487A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks. In other rail systems 108, each rail in one direction (e.g. an X direction) may comprise one track and each rail in the other, perpendicular direction (e.g. a Y direction) may comprise two tracks.

WO2018/146304A1, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301,401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Once the storage container 106 has been lowered through the port column 119, 120, the transportation from the port to the access station may require movement along various different directions, by means such as delivery vehicles, trolleys or other transportation lines. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301,401 can drop off storage containers 106 to be transported to an access or a transfer station, and the second port column 120 may be a dedicated pick-up port column where the container handling vehicles 201,301,401 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301,401 is instructed to retrieve the target storage container 106 from its position and transport it to the drop-off port column 119. This operation involves moving the container handling vehicle 201,301,401 to a location above the storage column 105 in which the target storage container 106 is positioned, retrieving the storage container 106 from the storage column 105 using the container handling vehicle's 201,301,401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201,301,401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301,401 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301,401 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301,401 so that a desired storage container 106 can be delivered to the desired location at the desired time without the container handling vehicles 201,301,401 colliding with each other, the automated storage and retrieval system 1 comprises a control system 500 which typically is computerized and which typically comprises a database for keeping track of the storage containers 106.

Some cube storage solutions have been suggested in which storage containers can be retrieved without digging. One example is WO2020210558A1. In this way the storage containers can be retrieved faster. However, a substantial part of the storage capacity must be sacrificed.

It is therefore an objective of the present invention to reduce the sacrifice of storage space required to achieve a storage and retrieval system wherein storage and retrieval can be performed without digging.

WO2020/210558A1 discloses a logistics tower including a vertical storage cell column, a vertical retrieval system and a horizontal shuttle system. The vertical storage cell column includes an elevator shaft extending therethrough and a plurality of storage modules arranged around the elevator shaft. The vertical retrieval system includes a winch and a robotic bin handler. The robotic bin handler is movable by the winch within the elevator shaft of the vertical storage cell column. The robotic bin handler includes a carriage assembly that is extendable and retractable inwardly and outwardly therefrom to access and retrieve storage bins from the storage modules arranged around the elevator shaft. The carriage assembly includes a gripping assembly that selectively couples and decouples the storage bin to the carriage of the robotic bin handler. The vertical retrieval system lowers the storage bin coupled to the carriage assembly to a robotic shuttle situated on the horizontal shuttle system.

SUMMARY OF THE INVENTION

The present invention is set forth and characterized in the independent claims, while the dependent claims describe other characteristics of the invention.

The present invention relates to an automated storage and retrieval system comprising:

a rail system comprising a first set of parallel rails arranged in a horizontal plane and extending in a first direction and a second set of parallel rails arranged in the horizontal plane and extending in a second direction which is orthogonal to the first direction, which first and second sets of rails form a grid in the horizontal plane comprising a plurality of adjacent cells, wherein each of the cells comprises an access opening; and a storage section located beneath or above the rail system, wherein storage positions in the storage section are accessible through the access openings of the rail system;

wherein the storage section comprises a plurality of storage towers for storing goods holders and configured for movement in at least one of the first direction and the second direction, and at least one column void defined by the space between two or more of the plurality of storage towers, the at least one column void having a footprint corresponding to an area of at least one cell; and wherein the at least one column void can be repositioned within the storage section into vertical alignment with different access openings via movement in at least one of the first direction and the second direction of at least one of the plurality of storage towers.

The column void may be used as a port column. A more dynamic automated storage and retrieval system can thus be achieved.

The column void may also provide sideways access to the goods holders stored in storage towers adjacent the column void. Sideways access may allow the goods holder to be retrieved by the container handling vehicle without performing a digging operation and can therefore be advantageous at least in terms of a faster retrieval of the goods holder.

The storage towers may be moved in at least one of the first direction and the second direction within the storage section, i.e. from vertical alignment with a first access opening into vertical alignment with a second access opening of the rail system.

The storage towers are preferably movable in both the first direction and the second direction.

The storage towers may be movable within the entire storage section. As such, the column void may be repositioned to any position within the storage section.

The at least one column void can preferably be repositioned within the storage section into vertical alignment with different access openings via movement in at least one of the first direction and the second direction of at least one of the plurality of storage towers within the storage section. The at least one column void can thus be repositioned within the storage section without any storage towers having to be removed from the storage section.

A storage section may be defined as the area directly below the rail system. The rail system may typically comprise a plurality of access openings in the first direction X and a plurality of access openings in the second direction Y.

With the movable storage towers, it is achieved an automated storage and retrieval system wherein the goods holders arranged in any one of the storage towers can be accessed from the side. This can be achieved with only one column void, which would provide a dense storage. However, it is recognized that having several column voids would increase the flexibility of the system and also increase the number of goods holders possibly being retrieved at the same time.

It is thus achieved an automated storage and retrieval system with high storage density wherein goods holders can be retrieved faster.

The column void may also provide access to a human picker. If several column voids are arranged next to each other, a passage can be formed for a human picker or a robotic picker to enter from an outside of the storage section. The picker can then retrieve one or several goods holders from the storage towers adjacent the column voids.

The column void(s) can be moved in at least one of the first direction X and the second direction Y when repositioned within the storage section.

This system may be used for vertical farming.

In one aspect, each storage tower may preferably have a footprint corresponding to an area of n cells, wherein n is an integer of 1 or more. However, the storage tower may have any footprint.

The footprint of the storage tower may correspond to an area of one cell (1×1), two cells (1×2), three cells (1×3), four cells (1×4 or 2×2), etc. There may be storage towers with equal footprints or with different footprints within the same system.

The storage towers will then be better configured for vertical alignment with the cells of the rail system. This will also allow the column voids to be vertically aligned with the cells of the rail system when the storage towers are vertically aligned with the cells of the rail system.

The footprint of the column void may change in response to movement of the storage towers, and thus be dynamic.

When the storage towers are vertically aligned with the cells of the rail system, the footprint of the column void preferably has a footprint corresponding to an area of n cells, wherein n is an integer of 1 or more.

To provide sideways access to all storage positions of each storage tower, the footprint of the storage tower should not exceed two cells in both directions (e.g. 3×3 or greater). The footprint may exceed two cells in one direction if it does not exceed two cells in the second direction (e.g. 2×4).

However, if the footprint of the storage tower does exceed two cells in both directions, the storage positions that are not accessible through a side opening may still be reached through a top opening of the storage tower. Alternatively, the lifting device may comprise a telescopic part configured to extend in the sideways direction beyond a first adjacent storage position.

In one aspect, the storage and retrieval system may comprise only one storage tower and one column void. The storage tower will then typically have a 1×2 footprint.

Sideways access will then be provided to all storage positions by moving the column void to either side of the storage tower.

In one aspect, each storage tower may comprise a framework of upright members and horizontal supports distributed vertically with vertical offsets for supporting goods holders in storage positions.

The vertical offsets may vary within one storage tower. The vertical offsets may also vary between two different storage towers.

Each storage tower preferably comprises a plurality of storage positions.

The vertical offset can be adapted to the sized of the goods holder. The vertical offsets of one storage tower does not need to be equal. The vertical offset may also vary between storage towers in the same system. The vertical offset may be set based inter alia on the size of the goods holder, the size of the goods to be handled (e.g. in vertical farming the plants may extend above the goods holder), and the type and size of the lifting device (e.g. the lifting device may be configured to grab the goods holder from above or lift the goods holder from below).

The purpose of the horizontal supports is to provide a storage position for the goods holders to be stored in the storage section.

In one aspect, each horizontal support may be pivotably connected to the storage tower, e.g. to the upright members or a horizontal member, and movable between:

a first position, wherein the horizontal support is arranged to obstruct vertical movement of the goods holder in the storage tower such that a storage position is provided, and a second position, wherein the horizontal support is arranged not to obstruct vertical movement of the goods holder in the storage tower such that the goods holder is allowed to move to a different vertical elevation in the storage tower.

The horizontal support may have a horizontal axis of rotation or a vertical axis of rotation.

The horizontal support may be a plate covering the entire vertical cross section of the storage tower. Alternatively, the horizontal support may only cover a part of the horizontal cross section of the storage tower sufficient to obstruct and support the goods holder.

The horizontal support may be one single piece or several pieces cooperating in providing a support to the goods holder.

When the horizontal support is in the second position, a goods handler can move vertically past the horizontal support if it is being stored or retrieved from above. It is thus possible to reach lower storage positions of the storage tower without sideways access to the target storage position.

When the horizontal support is in the second position, it may guide the lifting device of a container handling vehicle in the vertical direction through an adjacent storage column.

When the horizontal support is in the second position, it may cover at least parts of a side opening of the storage tower and thus prevent sideways access into the storage tower.

In one aspect, each storage tower may comprise drive means configured to drive the storage tower in at least one of the first direction and the second direction, or wherein the system comprises a displacement device configured to displace the storage tower in at least one of the first direction and the second direction.

Each storage tower may have a base. If the storage tower comprises drive means, the drive means can be arranged in the base. If the system comprises a displacement device, the base can provide an interface for the displacement device.

The drive means of the storage tower may comprise a first set of wheels and a second sets of wheels which enable lateral movement of the storage tower in the first direction and in the second direction, respectively.

If the storage tower comprises two sets of wheels, at least one of the sets of wheels may be configured for lifting and lowering, so that the first set of wheels and/or the second set of wheels can be engaged with a drive surface, such as a warehouse floor or a rail system, at any one time.

If the drive surface is a rail system, the first set of wheels may be arranged to engage with two adjacent rails of a first set of rails, and the second set of wheels may be arranged to engage with two adjacent rails of a second set of rails, perpendicular to the first set of rails.

The drive means may comprise one or several motor(s) configured to provide torque to at least one wheel to cause movement of the storage tower in the first direction and/or the second direction. The motor may be engaged with one or several wheel(s) by means of belts(s), chain(s) and/or shaft(s). Alternatively, the motor may be a hub motor, such as an outer rotor motor arranged within a wheel.

The drive means may comprise a power source configured to operate the one or several motor(s). The power source is typically a battery. Alternatively, power may be provided to the drive means from an external source.

The displacement device may be releasably engageable with the storage towers. One displacement device may be configured to move one or several storage towers. If the displacement device is configured to move several storage towers, it may either move one storage tower at a time or a number of storage towers at the same time.

In one aspect, the system may further comprise:

a control system configured to monitor and control movements of the plurality of storage towers.

The control system may communicate wirelessly with the plurality of storage towers. Alternatively, the control system may communicate with the plurality of storage towers by means of signals transmitted via the base they are movable along, e.g. a second rail system.

The control system may be configured to also monitor and control movement of the container handling vehicles.

In one aspect, each storage tower may comprise a side opening and an adjustable blocker for obstructing the side opening, wherein the blocker comprises a vertical surface for guiding a lifting device of a container handling vehicle over the side opening, and the blocker is movable between:

a first position, wherein the vertical guiding surface is positioned to guide the lifting device and obstruct horizontal movement of the goods holder through the side opening, and a second position, wherein the vertical guiding surface is positioned not to guide the lifting device and allow horizontal movement of a storage container through the side opening.

The adjustable blocker can facilitate movement of a lifting device through the column voids that in themselves do not provide any guiding for the lifting device. This is particularly beneficial when the lifting device is lifted and lowered by means of flexible bands.

In one aspect, at least one storage tower may move outside of the storage section.

In addition to being movable within one storage section, the storage towers can be moved between different storage sections of one facility or even between different facilities.

In one aspect, the system may be configured to provide a predetermined climate zone.

The predetermined climate zone may be set by parameters such as humidity, temperature, and light. This can be advantageous if the system is used for vertical farming or as a cold storage.

The present system is advantageous e.g. when the cold zone of the cold storage is limited to the grid, i.e. the rail system and the container handling vehicles are located outside the cold zone. By not having to perform digging operations, the period of heat exchange with the outside of the cold zone is reduced. Furthermore, only the target goods holder is retrieved to the outside of the cold zone.

This system will thus be particularly suited for storing groceries.

In one aspect, the automated storage and retrieval system may further comprise:

a plurality of goods holders arranged in the storage section.

The goods holder may e.g. be a storage container, a bin, a tote, a pallet, a tray or similar. Different types of goods holders may be used in the same system.

Alternatively, the goods holder may be a drawer device attachable to the storage tower. When attached to a storage tower, the drawer device may open into an adjacent column void. Storage items may then be picked from the drawer device via the column void. Then the lifting device does not need a telescopic part.

In one aspect, the storage section may be located beneath the rail system, and the automated storage and retrieval system may further comprise:

a container handling vehicle comprising a lifting device for lifting goods holders and drive means configured to drive the vehicle along the rail system in at least one of the first direction and the second direction.

The container handling vehicle may be an overhead crane.

Storage items may be stored in the storage towers without using the goods holders, e.g. directly on supports for goods holders of the storage towers.

The system may use vehicles moving along the same base as the storage towers to store and retrieve storage items, either in addition to or instead of the container handling vehicles moving along the rail system.

The drive means of the container handling vehicle may comprise a first set of wheels and a second sets of wheels which enable lateral movement of the container handling vehicle in the first direction and in the second direction, respectively.

At least one of the sets of wheels may be configured for lifting and lowering, so that the first set of wheels and/or the second set of wheels can be engaged with the rail system, at any one time.

The first set of wheels may be arranged to engage with two adjacent rails of the first set of rails, and the second set of wheels may be arranged to engage with two adjacent rails of the second set of rails.

The drive means may comprise one or several motor(s) configured to provide torque to at least one wheel to cause movement of the container handling vehicle in the first direction and/or the second direction. The motor may be engaged with one or several wheel(s) by means of belts(s), chain(s) and/or shaft(s). Alternatively, the motor may be a hub motor, such as an outer rotor motor arranged within a wheel.

The drive means may comprise a power source configured to operate the one or several motor(s). The power source is typically a battery. Alternatively, power may be provided to the drive means from an external source.

In one aspect, the lifting device may comprise a telescopic part for sideways entry of the lifting device into the storage tower.

Alternatively, the horizontal support of the storage tower may comprise a telescopic part configured to present a stored goods holder in the column void.

Having horizontal supports with telescopic parts will provide a faster retrieval of goods holders in the system. Having the telescopic part arranged on the lifting device will reduce the number of moving components in the storage system.

In one aspect, the plurality of storage towers may comprise wheels which are configured for engagement with an underside of the rail system.

In one aspect, the rail system may be a first rail system and the automated storage and retrieval system may further comprise a second rail system arranged in a second horizontal plane below the storage section;

wherein the second rail system comprises:

a third set of parallel rails vertically aligned with the first set of parallel rails of the first rail system, and a fourth set of parallel rails vertically aligned with the second set of parallel rails of the first rail system; and wherein each storage tower is configured for movement along the second rail system.

The second rail system may be arranged on a level of the warehouse floor or at a level above the warehouse floor.

If the second rail system is arranged at a level above the warehouse floor, robots may travel on a level below the second rail system and the storage section may thus be access from below, i.e. through the access openings of the second rail system. It is thus provided a system wherein the goods holders can be retrieved from below the storage section.

Robots traveling below the second rail system may comprise a lifting device for lifting goods holders and drive means configured to drive the robot in at least one of the first direction and the second direction.

The robots traveling below the second rail system may be remotely operated delivery vehicles. The remotely operated delivery vehicles may be configured to receive a goods holder from above and to transport the received good handling structure to another location.

As an alternative to the second rail system, the storage towers may be configured for movement along the warehouse floor.

In one aspect, the plurality of storage towers may comprise wheels which are configured for engagement with an underside of the first rail system.

Uneven weight distribution of the product items stored in one storage tower may in combination with sudden movements of the storage tower cause the storage tower to tilt. Tilting may cause the storage tower to jam, tip over or derail. The wheels arranged in the upper part of the storage tower will prevent the storage tower from tilting. The storage tower can then safely accelerate and decelerate faster.

The storage towers may be configured to support some of the weight of the rail system and the associated container handling vehicles. It is thus achieved an automated storage and retrieval system wherein the framework structure can be constructed with fever upright members. This will in turn allow a greater part of the storage section to be free of upright members. The storage towers or other robots operating in the storage section can then move more freely without being obstructed by upright members.

In one aspect, the underside of the first rail system may be provided with tracks for guiding storage towers in the first direction and the second direction.

The first rail system also has an upper side. The upper side is typically provided with tracks for guiding container handling vehicles in the first direction and the second direction.

The rail system may comprise a single track system. Alternatively, the rail system may comprise a double track system, thus allowing a container handling vehicle having a footprint generally corresponding to the lateral area defined by a cell to travel along a row of cells even if another container handling vehicle is positioned above a cell neighboring that row. Alternatively, the rail system may comprise a combination of both single tracks and double tracks, e.g. single tracks in the first direction and double tracks in the second direction.

The first rail system may comprise any of these track systems on its upper side and/or its underside.

The second rail system may comprise any of these track systems.

In one aspect, at least one storage tower may be configured to receive at least one goods holder from above via an access opening.

Typically, the uppermost horizontal support of each storage tower may be configured to receive a goods holder from above. This is typically performed by arranging the storage tower in vertically aligned with an access opening of the rail system and lowering the goods holder through the access opening and a top opening of the storage tower.

This can be achieved while all the horizontal supports of the storage tower are static.

The uppermost horizontal support configured to receive the goods holder from above through the top opening of the storage tower may also be configured to receive the goods holder sideways from an adjacent column void through a side opening of the storage tower.

In one aspect, the system may further comprise a plurality of stacks of storage containers arranged in storage columns that are each located beneath an access opening of the first rail system.

The plurality of stacks of storage containers will typically be arranged in a separate section of the automated storage and retrieval system, preferably adjacent the storage section comprising storage towers.

The storage section may comprise a combination of storage towers and storage columns with a ration adaptable for individual automated storage and retrieval systems.

The goods holders stored in the storage tower(s) may contain an order due to be collected by a customer. By having one or several storage towers available for storing goods holders containing orders, it is achieved a buffer storage that can provide a more time efficient delivery of orders to a customer or other recipients.

The goods holders stored in the storage tower(s) may contain frequently picked items. By having one or several storage towers available for storing goods holders containing frequently picked items, it is achieved a buffer storage that can provide a more time efficient delivery of items to a picker. The picker may be a robotic picker or a human picker.

This system will thus be particularly suited for micro fulfilment.

The present invention also relates to a method for storing and/or retrieving a goods holder using an automated storage and retrieval system as described herein, wherein the storage section is located beneath the rail system; and wherein the automated storage and retrieval system further comprises:

a plurality of goods holders arranged in the storage section; and a container handling vehicle comprising a lifting device for lifting goods holders and drive means configured to drive the vehicle along the rail system in at least one of the first direction and the second direction;

wherein the method comprises the steps of:

moving one or several storage towers in a first direction and/or a second direction to reposition the at least one column void into vertical alignment with a first access opening of the rail system and adjacent the storage tower in which a target goods holder is stored or is to be stored, moving the container handling vehicle to the first access opening, lowering a lifting device of the container handling vehicle into the first column void via the first access opening, and retrieving or storing the target goods holder by means of the lifting device.

The goods holder(s) to be stored and retrieved in the storage towers are suited for storing orders due to be collected by a customer. These orders can then quickly be retrieved once the customer arrives.

By having storage towers available for storing goods holders containing orders, it is achieved a buffer storage that can provide a more time efficient delivery of orders to a customer or other recipients.

The goods holder to be stored may contain frequently picked items. By having storage towers available for storing goods holders containing frequently picked items, it is achieved a buffer storage that can provide a more time efficient delivery of items to a picker. The picker may be a robotic picker or a human picker.

In one aspect, the method may further comprise the steps of:

moving one or several storage tower in a first direction and/or a second direction to arrange the one or several storage tower at a peripheral area of the storage section; and collecting the one or several storage tower for transport to another facility.

In one aspect, the method may further comprise the step of:

transporting one or several storage tower(s) from the automated storage and retrieval system to another facility, or from the storage section to another part of the facility on which the automated storage and retrieval system is located.

The collected storage tower(s) may be loaded on a van, lorry, trailer or in a container for shipping. In these applications, the storage towers may provide dense storage and quick access to all the goods holders.

The collected storage tower(s) may store goods holders containing orders to be delivered to customers, such as groceries.

The peripheral area of the storage section is typically the volume below the outermost cells of the rail system.

In one aspect, the method may further comprise the step of:

moving one or several storage towers in a first direction and/or a second direction to provide the at least one column void at a peripheral area of the storage section such that a passage is provided to the storage section from an outside of the storage section.

It is achieved direct access for a human picker or a robotic picker to a target goods holder stored in the grid. It is thus possible to bypass the container handling vehicle.

It is also provided access for a remotely operated delivery vehicle into the grid. The remotely operated delivery vehicle may receive or deliver a goods holder from an above container handling vehicle.

It is also provided access for a climbing robot into the grid.

BRIEF DESCRIPTION OF THE DRAWINGS

Following drawings are appended to facilitate the understanding of the invention. The drawings show embodiments of the invention, which will now be described by way of example only, where:

FIG. 9 is a perspective view of a portion of the automated storage and retrieval system wherein the storage towers comprises wheels which are configured for engagement with an underside of the same rail system as container handling vehicles can move on the upper side of;

FIG. 12a is a first side view of the storage tower and a displacement device of FIG. 11a;

FIG. 12b is a second side view of the storage tower and a displacement device of FIG. 11a;

DETAILED DESCRIPTION OF THE INVENTION

Figure 1:
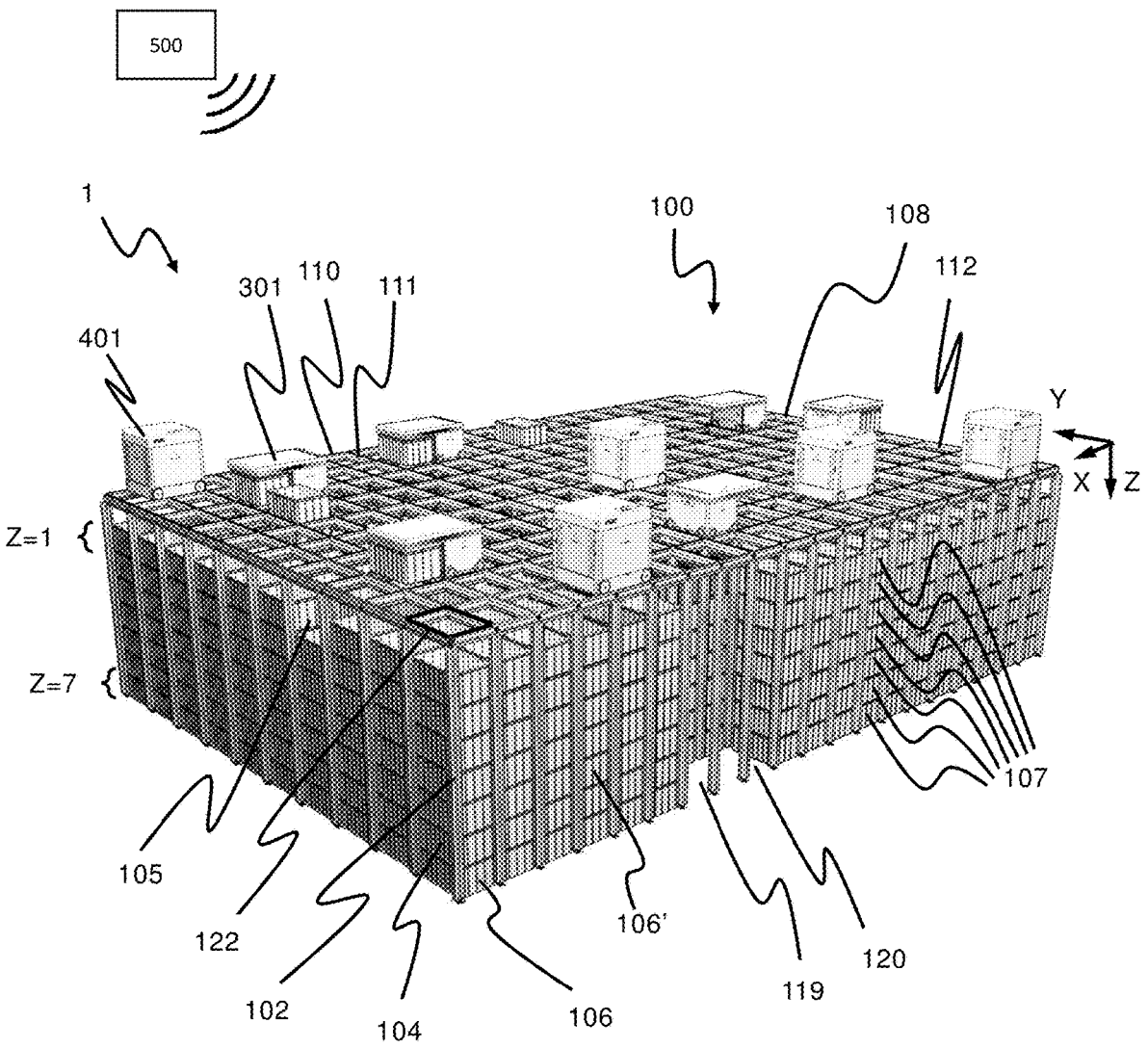
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
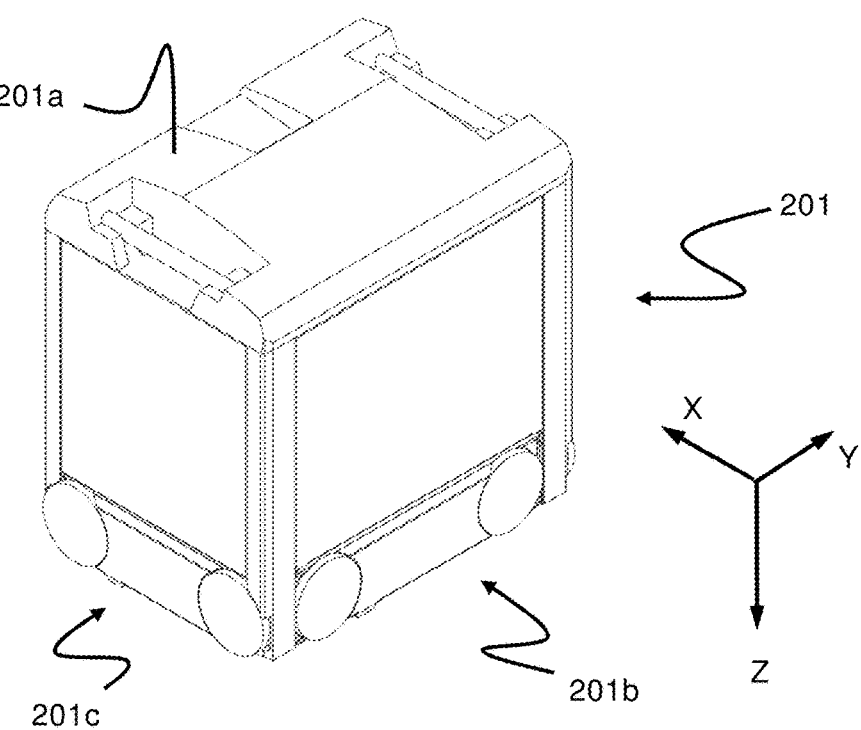
FIG. 2 is a perspective view of a prior art container handling vehicle having an internally arranged cavity for carrying storage containers therein.
Figure 3:
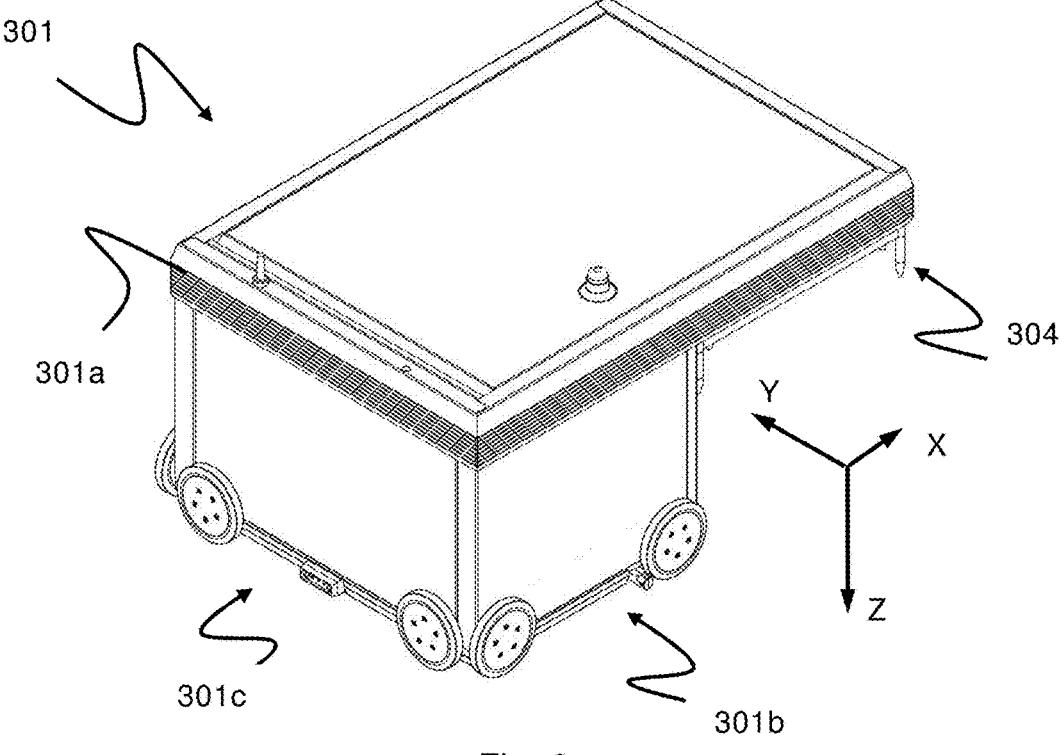
FIG. 3 is a perspective view of a prior art container handling vehicle having a cantilever for carrying storage containers underneath.
Figure 4:
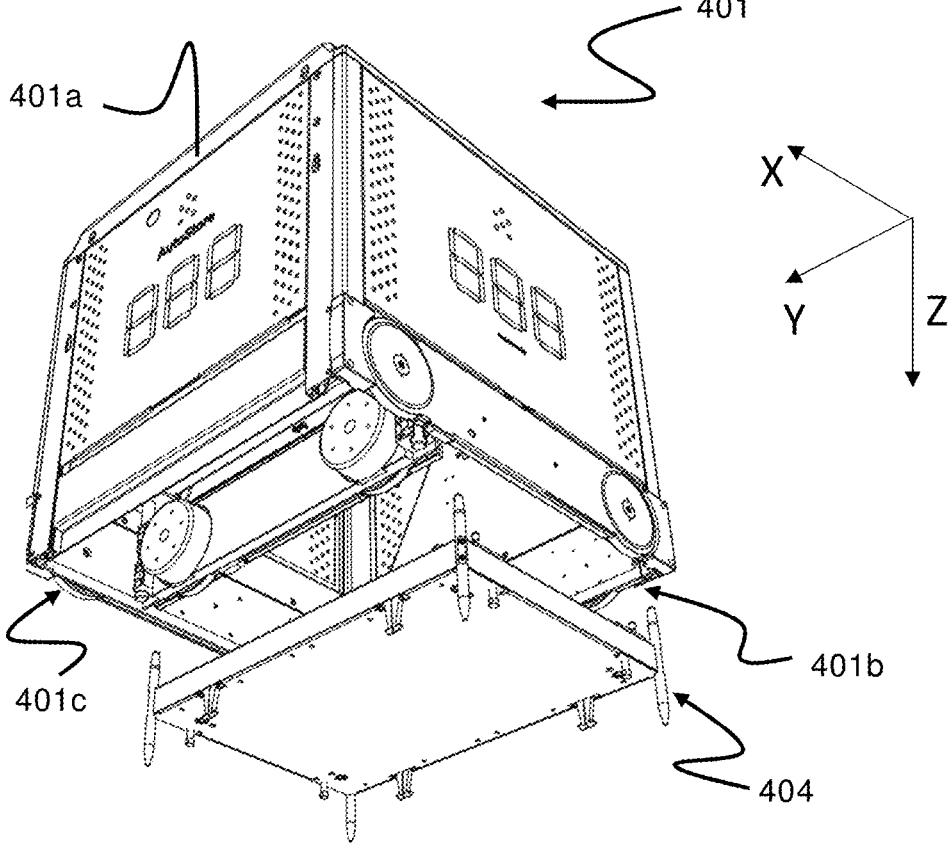
FIG. 4 is a perspective view of a prior art container handling vehicle having an internally arranged cavity for carrying storage containers therein.

The framework structure 100 of the automated storage and retrieval system 1 is constructed in a similar manner to the prior art framework structure 100 described above in connection with FIGS. 1-3. That is, the framework structure 100 comprises a number of upright members 102, and comprises a first, upper rail system 108 extending in the X direction and Y direction.

The framework structure 100 further comprises storage compartments in the form of storage columns 105 provided between the members 102, wherein storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

One embodiment of the automated storage and retrieval system according to the invention will now be discussed in more detail with reference to Figs.

Figure 5:
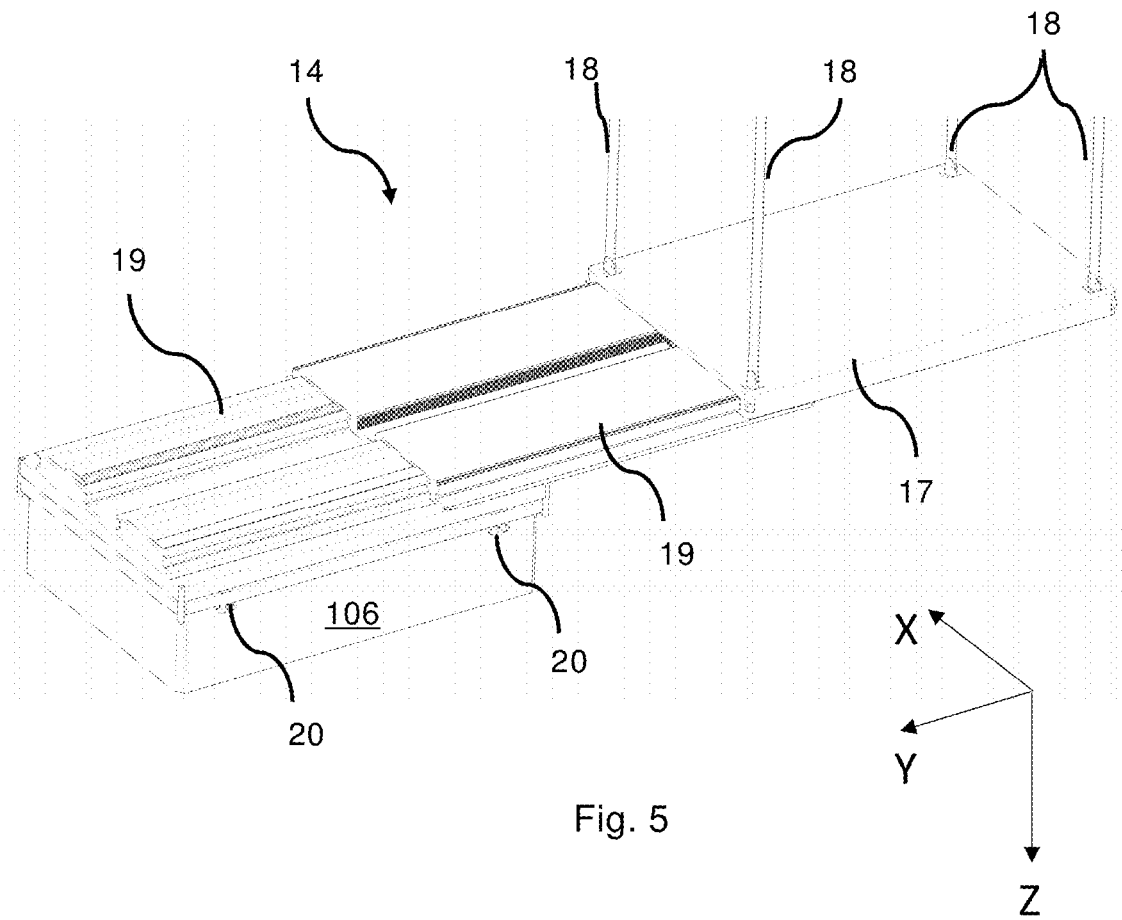
FIG. 5 is a perspective view of a lifting device for a container handling vehicle.

FIG. 5 shows a perspective view of a lifting device 14 for a container handling vehicle 201,301,401. The lifting device 14 comprises a telescopic part 19 allowing the lifting device 14 to extend horizontally sideways relative a base part 17 of the lifting device 14 in the second direction Y (as illustrated), in the first direction X, or in both the first direction X and the second direction Y. In FIG. 5, the telescopic part 19 is extended to one side of the base part 17 in the second direction Y. The telescopic part 19 will normally also be extendable to the opposite side of the base part 17.

The lifting device 14 may comprise lifting bands 18 connected to the base part 17 at a first end and the container handling vehicle 201,301,401 at a second end. The lifting bands 18 allows for vertical movement of the lifting device 14 in the third direction Z (i.e. vertical movement).

The lifting device 14 may comprise grippers 20 for grabbing a goods holder.

When the lifting device 14 is carrying a goods holder (such as a storage container 106), extending the telescopic part will move the carried goods holder relative to the base part 17.

When the lifting device 14 is lowered into a port column 119,120 or a column void 522, extending the telescopic part 19 may move the carried goods holder and a part of the telescopic part 19 into an adjacent storage position. The lifting device 14 may thus make sideways entry through a side opening 516 of a storage tower 510.

The lifting device 14 may therefore be used to store and/or retrieve goods holders in/from a storage tower 510 via an adjacent column void 522.

Figure 6:
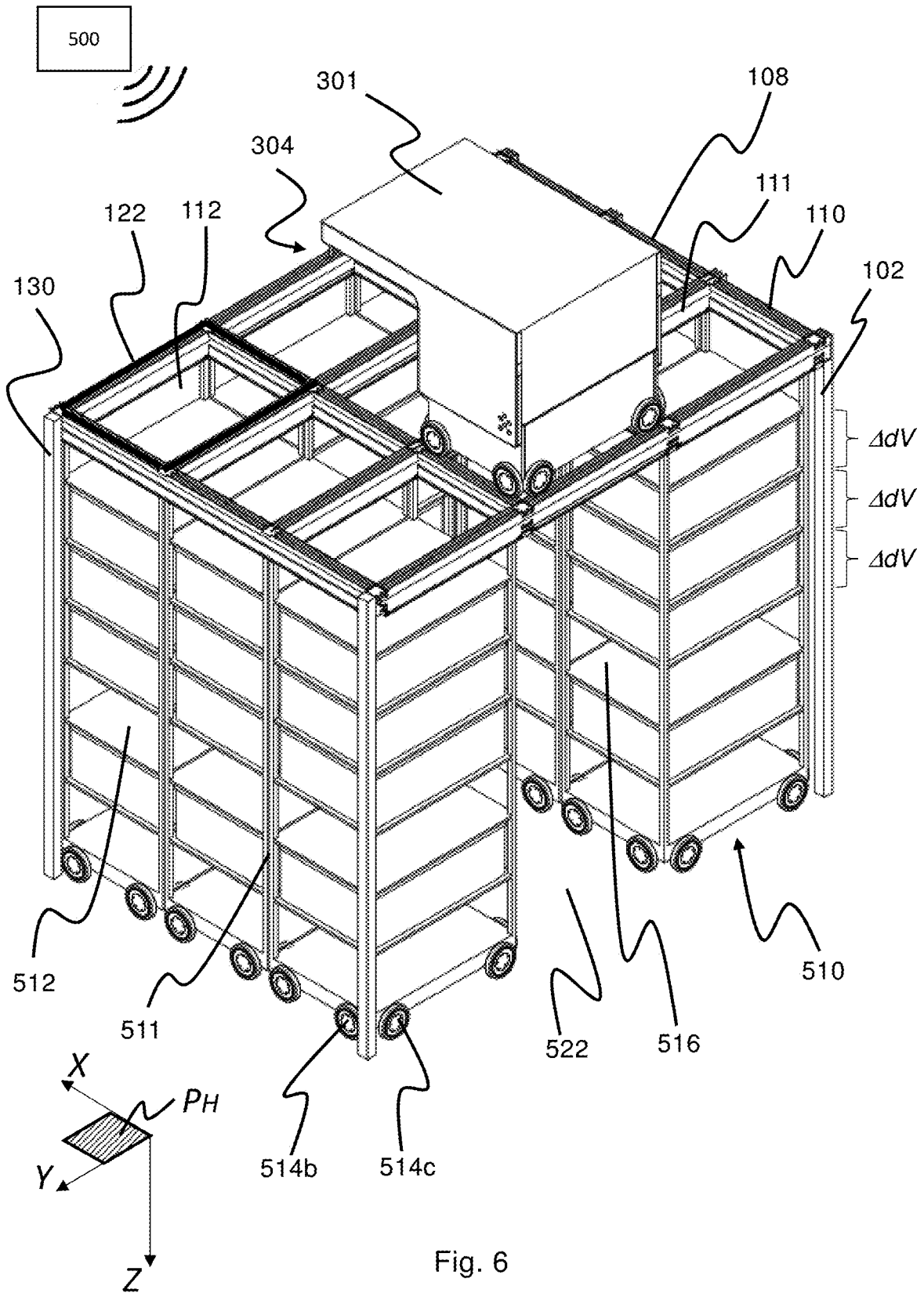
FIG. 6 is a perspective view of the automated storage and retrieval system wherein a container handling vehicle is movable along a rail system and the storage towers are movable along a drive surface in the form of a floor.

FIG. 6 is a perspective view of the inventive automated storage and retrieval system. The automated storage and retrieval system comprises a rail system 108 and a storage section 130 located beneath the rail system 108.

The rail system 108 comprises a first set of parallel rails 110 arranged in a horizontal plane $P_H$ and extending in a first direction X and a second set of parallel rails 111 arranged in the horizontal plane $P_H$ and extending in a second direction Y which is orthogonal to the first direction X. The first and second sets of rails 110, 111 form a grid in the horizontal plane $P_H$ comprising a plurality of adjacent cells 122. Each of the cells (122) comprises an access opening (112). Storage positions in the storage section 130 may be accessed through the access openings 112 of the rail system 108.

The storage section 130 comprises a plurality of storage towers 510. The storage towers 510 are configured for storing goods holders and for movement in at least one of the first direction X and the second direction Y. In FIG. 6, the storage towers 510 are movable along a drive surface in the form of a warehouse floor. Individual storage towers 510 can be moved independently or as a group.

The plurality of storage towers 510 will typically be arranged side-by-side to form a grid corresponding to the above rail system 108. In FIG. 6, each storage tower 510 has a footprint corresponding to an area of one cell 122. Therefore, the grid of storage towers 510 can be vertically aligned with the grid of the rail system 108.

The storage section 130 comprises at least one column void 522 defined by the space between two or more of the plurality of storage towers 510. The at least one column void 522 typically has a footprint corresponding to an area of at least one cell 122.

The at least one column void 522 can be repositioned within the storage section 130 into vertical alignment with different access openings 112 by moving one or more of the plurality of storage towers 510 in the first direction X and/or the second direction Y.

The automated storage and retrieval system illustrated in FIG. 6 further comprises a plurality of goods holders. The goods holders can be stored in the storage towers 510 arranged in the storage section 130. Each storage tower 510 is preferably configured to store a plurality of goods holders.

The automated storage and retrieval system illustrated in FIG. 6 further comprises a container handling vehicle 301 comprising a lifting device 304 for lifting goods holders. The container handling vehicle 301 also comprises drive means configured to drive the container handling vehicle 301 along the rail system 108 in at least one of the first direction X and the second direction Y.

Each storage tower 510 may comprise drive means configured to drive the storage tower 510 along the drive surface in at least one of the first direction X and the second direction Y.

The system may further comprise a control system 500 configured to monitor and control movements of the plurality of storage towers 510. The same control system 500 may also be configured to monitor and control movement of the container handling vehicle 301 and any other remotely operated vehicles or robots used with the automated storage and retrieval system.

By moving one or several storage towers 510 in a first direction X and/or a second direction Y one or several column voids 522 can be repositioned in the storage section 130. The column void 522 is preferably vertically aligned with one of the cells 122 (which also makes it vertically aligned with one of the access openings 112). If all the storage towers 510 have a footprint corresponding to an area of one cell 122 and are all vertically aligned with different cells 122, the vertical alignment of the column void 522 with one access opening 112 will follow. The column void 522 may be vertically aligned with a plurality of cells 122 (which also makes it vertically aligned with a plurality of access openings 112). A plurality of individual column voids 522 may be separated by storage towers 510 within the same storage section 130.

Each column void 522 may have a footprint corresponding to an area of n cells 122, wherein n is an integer of 1 or more.

In FIG. 6, the illustrated column void 522 has a footprint corresponding to two cells 122 (which may be referred to as a 1×2 footprint).

In FIG. 6 each illustrated storage tower 510 has a footprint corresponding to one cell 122 (which may be referred to as a 1×1 footprint).

The column void 522 of FIG. 6 has a 1×2 footprint and is vertically aligned with two cells 122 and thus also two access openings 112. This column void 522 can be considered as one column void 522 having a 1×2 footprint, or alternatively as two adjacent column voids 522 having a 1×1 footprint.

By moving one of the storage towers 510 with a 1×1 footprint into the column void 522 with a 1×2 footprint, the column void 522 will be split into two column voids 522 with a 1×1 footprint each.

Figure 14:
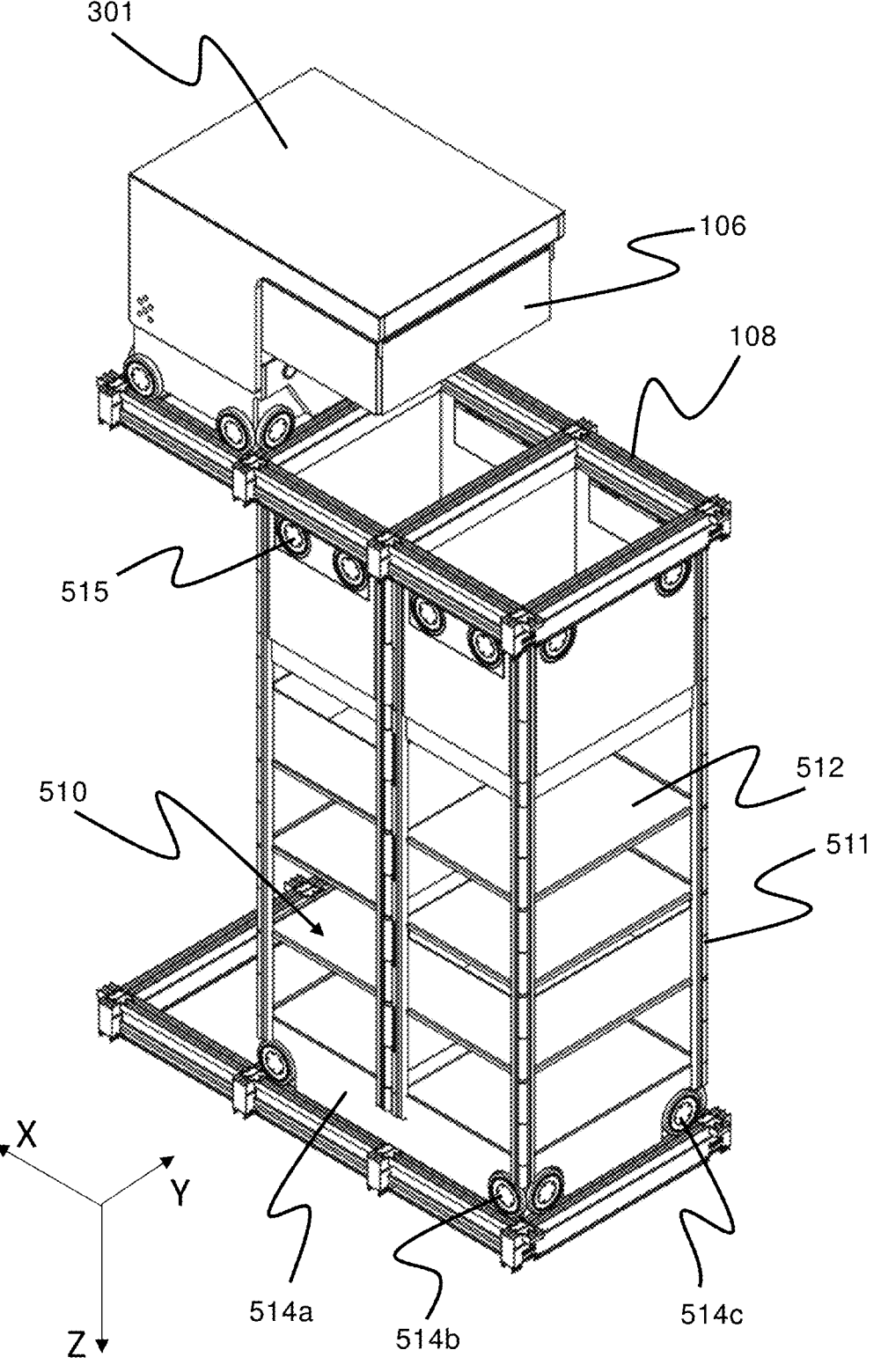
FIG. 14 is a perspective view of a storage tower with a footprint correspond to an area of two cells of the rail system.

By moving two of the storage towers 510 with a 1×1 footprint (alternatively one storage tower 510 with a 1×2 footprint as illustrated in FIG. 14) into the column void 522 with a 1×2 footprint, the entire column void 522 will be repositioned.

If the column void 522 of FIG. 6 is considered to be two adjacent column voids 522, by moving one of the storage towers 510 with a 1×1 footprint into one of the column voids 522 with a 1×1 footprint, that column void 522 will be repositioned and the other column void 522 will stay in the same position as before. The repositioned column void 522 will take the previous position of the moved storage tower 510.

In this way a column void 522 can be repositioned to a desired position in the storage section 130.

When a goods holder is to be stored in and/or retrieved from a target storage tower 510 in a sideways manner, one void column 522 can be repositioned to either side of the target storage tower 510. A container handling vehicle 301 can then be moved to the cell 122 vertically aligned with the column void 522, as illustrated in FIG. 6. The lifting device 304 can then enter the column void 522 via the access opening 112 in the cell 122. The goods holder can then be stored and/or retrieved in/from the storage tower 510 via side openings 516 in the storage tower 510.

In this way the storage towers 510 can also be repositioned to desired positions in the storage section 130.

If one or several storage towers(s) 510 are due to be transferred to another part of the automated storage and retrieval system outside the storage section 130 or to be collected for transport outside the automated storage and retrieval system, the storage tower(s) 510 can preferably be repositioned to a part of the storage section 130 in which they are easily accessible and allowed to exit the storage section 130. This will typically be at the outermost positions along the periphery of the storage section 130.

In FIG. 6, all the storage towers 510 are positioned along the periphery of the storage section 130. This is partly due to the storage section 130 having a footprint corresponding to the size of nine cells 122 (a 3×3 footprint). If the footprint was larger, the storage towers 510 positioned closer to the centre of the storage section 130 would typically not be as accessible as those closer to the periphery.

The storage towers 510 may be transferred out of the storage section 130 by means of a human operator or by being remotely operated.

The size and shape of the storage section 130 in FIG. 6 is made for illustration only. Any other size may be used. The size of the storage section 130 will typically be larger and does not necessarily have the same number of cells 122 in the first direction X as in the second direction Y.

The storage towers 510 can also be repositioned in the storage section 130 to form a column void 522 providing a passage into the storage section 130 from an outside of the storage section 130. This will allow a human picker or remotely operated vehicles/robots moving along the same drive surface as the storage towers 510 to enter the storage section 130 and thus access goods holders stored in the storage towers 510 adjacent the passage (i.e. the column voids 522 providing the passage).

In FIG. 6 a passage is formed into the storage section 130 from an outside of the storage section 130. The passage has a footprint corresponding to an area of two cells 122 and provides sideways access to five adjacent storage towers 510.

Figure 9:
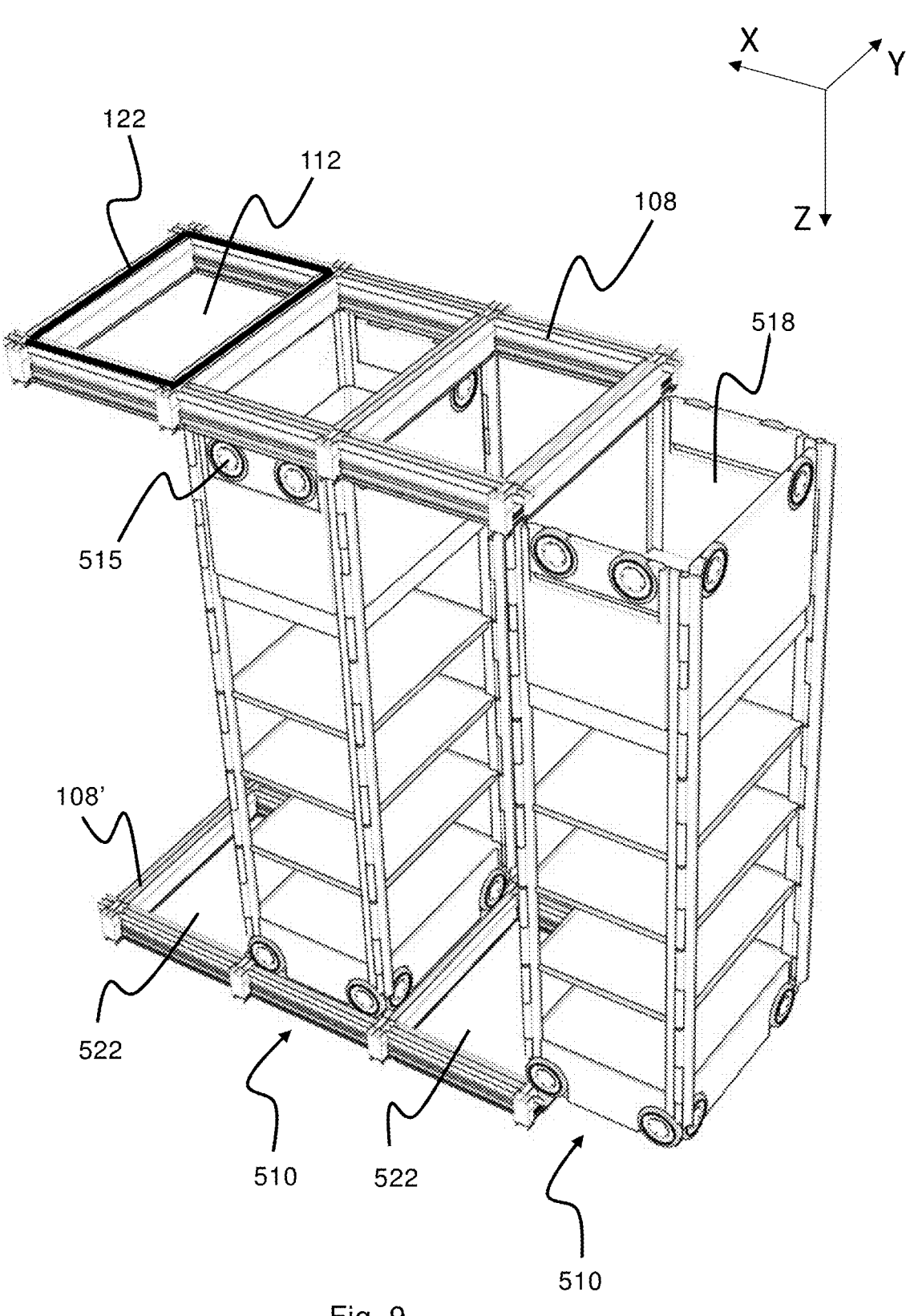

Goods holders may also be stored in and/or retrieved from the storage towers 510 from above. A container handling vehicle 301 can then be moved to the cell 122 vertically aligned with the target storage tower 510. The lifting device 304 can then enter the storage tower via the access opening 112 in the cell 122. The goods holder can then be stored in and/or retrieved from the storage tower 510 via a top opening 518 in the storage tower 510 (as illustrated in FIG. 9). This will allow at least one goods holder to be stored and/or retrieved from above. It can be envisaged that also a plurality of goods holders can be stored and/or retrieved from above through the top opening 518 of each storage tower 510.

Figure 7:
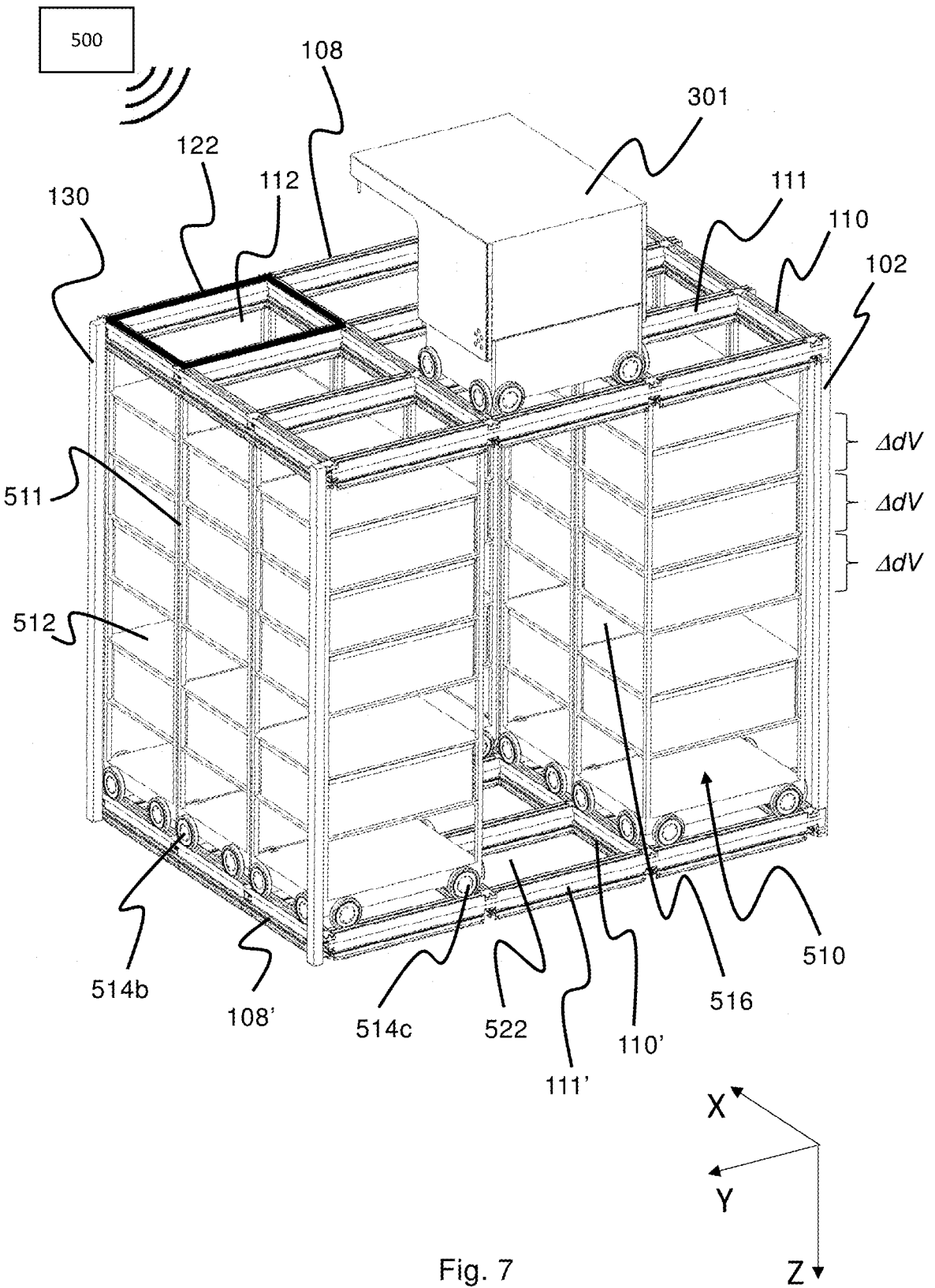
FIG. 7 is a perspective view of the automated storage and retrieval system wherein a container handling vehicle is movable along a first rail system and the storage towers are movable along a drive surface in the form of a second rail system.

FIG. 7 is a perspective view of the inventive automated storage and retrieval system. The automated storage and retrieval system of FIG. 7 may comprise all the features of the automated storage and retrieval system of FIG. 6.

Unlike the automated storage and retrieval system of FIG. 6, the automated storage and retrieval system of FIG. 7 further comprises a second rail system 108'. The rail system 108 on which the storage container handling vehicle 301 is moving can be considered the first rail system 108. The first rail system 108 is arranged in a first horizontal plane P$_H$ above the storage section 130. The second rail system 108' is arranged in a second horizontal plane P$_H$ below the storage section 130.

In FIG. 7, the storage towers 510 are configured for movement along a drive surface in the form of the second rail system 108'.

The second rail system 108' may comprise a third set of parallel rails 110'. The third set of parallel rails 110' are preferably vertically aligned with the first set of parallel rails 110 of the first rail system 108.

The second rail system 108' may further comprise a fourth set of parallel rails 111'. The fourth set of parallel rails 111' are preferably vertically aligned with the second set of parallel rails 111 of the first rail system 108.

The first rail system 108 preferably comprises a double track in both the first direction X and the second direction Y.

The second rail system 108' preferably comprises a double track in both the first direction X and the second direction Y (as illustrated inter alia in FIG. 7 and FIG. 9), such that storage towers 510 can be located on adjacent cells 122' of the second rail system 108' at the same time.

Figure 8:
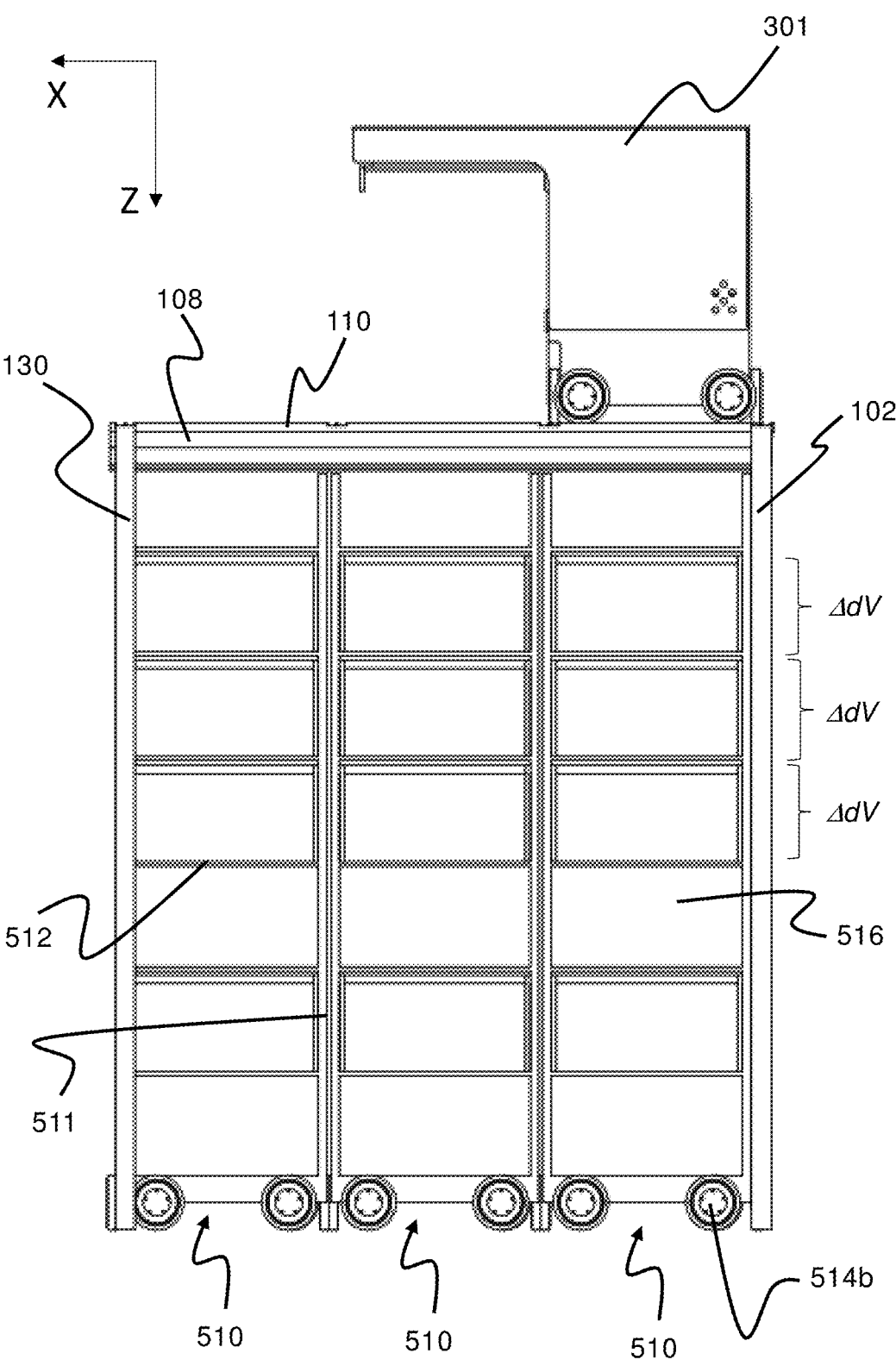
FIG. 8 is a side view of the automated storage and retrieval system shown in FIG. 6.

FIG. 8 is a side view of the automated storage and retrieval system shown in FIG. 6. Each of the storage towers 510 comprise seven storage positions. Four goods holders are stored in each storage tower 510 leaving three storage positions empty. Other numbers of storage positions may be provided in the storage towers 510 dependent on the height of the storage tower 510 and on the offset ΔdV between the storage positions.

The configuration of the storage tower 510 illustrated in FIG. 8 has six storage positions that are accessible for the side and one storage position that is accessible from above.

The storage towers 510 may be configured to allow sideways access to its storage positions from only one side, two sides, three sides or all four sides. In one configuration, sideways access may be allowed from two opposite sides.

FIG. 9 is a perspective view of a portion of the automated storage and retrieval system. This automated storage and retrieval system may comprise all the features of the automated storage and retrieval systems of FIG. 6 and FIG. 7.

Unlike the automated storage and retrieval systems of FIG. 6 and FIG. 7, in the automated storage and retrieval system of FIG. 9 the storage towers 510 further comprises wheels 515 which are configured for engagement with an underside of the first rail system 108. The first rail system 108 may have an underside on which the wheels 515 are configured to engage and at the same time have an upper side on which container handling vehicles 201,301,401 are configured to move.

The underside of the first rail system 108 is preferably provided with tracks for guiding storage towers 510 in the first direction X and the second direction Y.

The underside of the first rail system 108 preferably comprises a double track in both the first direction X and the second direction Y. The tracks provided on the underside of the first rail system 108 are preferably vertically aligned with the tracks provided on the upper side of the first rail system 108. The tracks provided on the underside of the first rail system 108 are preferably vertically aligned with the tracks provided on the second rail system 108'. The tracks provided on the second rail system 108' are provided on an upper side of the second rail system 108'.

Wheels 515 are preferably provided on all four sides of the storage towers 510, as illustrated in FIG. 9. However, wheels 515 may be provided on fever sides of the storage towers 510.

In FIG. 9, two wheels 515 are provided on each side of the storage towers 510. It is also possible to have only one wheel 515 on any of the sides of the storage towers 510. It is also possible to have more than two wheels 515 on any of the sides of the storage towers 510.

The wheels 515 may be considered as a first set of set of wheels and a second set of wheels which enable lateral movement along the underside of the first rail system 108 in the first direction X and in the second direction Y, respectively.

At least one of the sets of wheels may be configured for lifting and lowering, so that the first set of wheels and/or the second set of wheels can be engaged with the underside of the first rail system 108, at any one time.

The first set of wheels may be arranged to engage with two adjacent rails of the first set of rails 110, and the second set of wheels may be arranged to engage with two adjacent rails of the second set of rails 111.

One or several of the storage towers 510 may be configured to move outside of the storage section 130. In FIG. 9 one of the storage towers 510 are on the outside of the storage section 130 at a point where storage towers may enter or exit the storage section 130.

Figure 10:
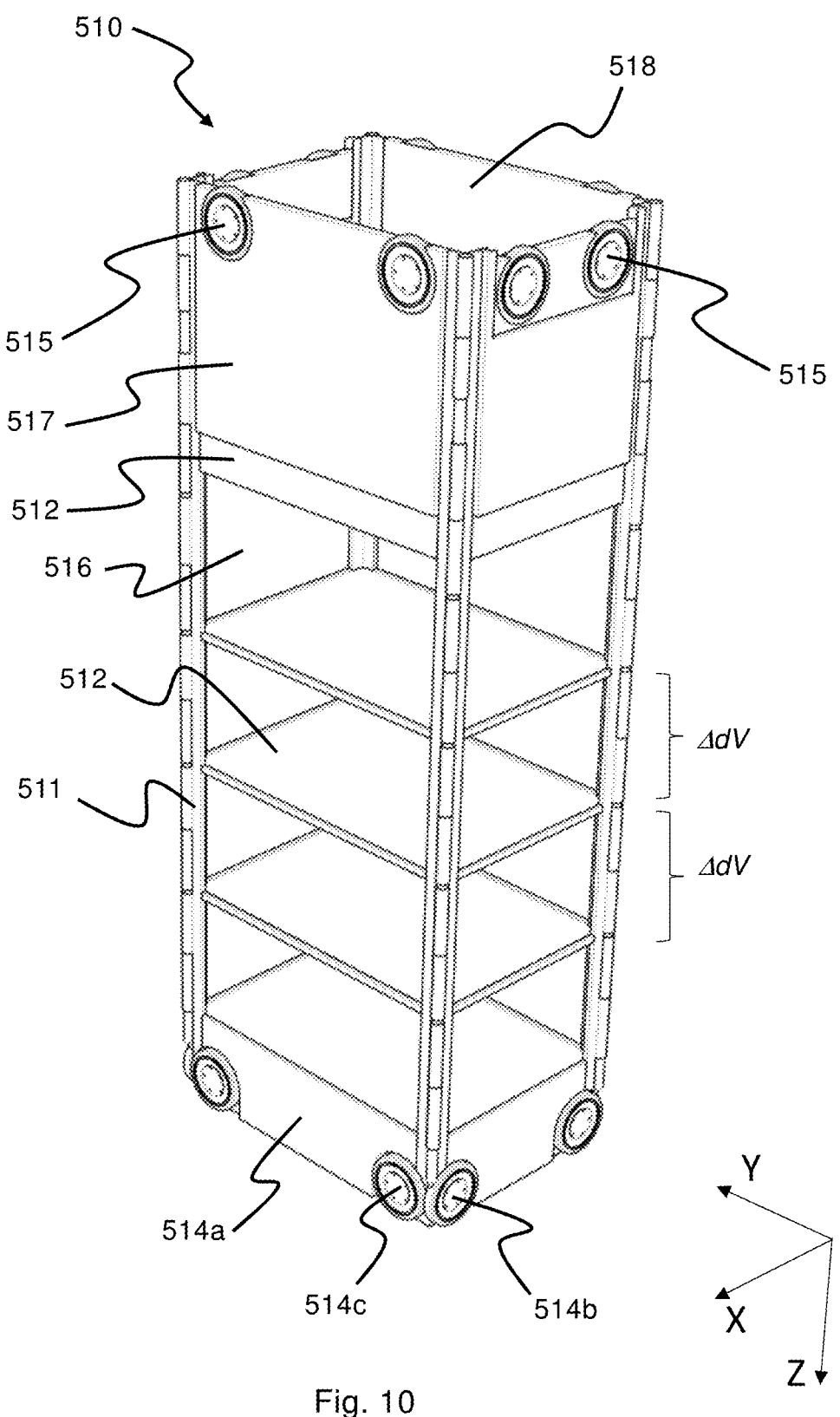
FIG. 10 is a perspective view of a storage tower comprising a base and a first set of wheels and a second set of wheels, both sets being arranged on the base and configured to allow movement of the storage tower in the first direction X and the second direction Y.

FIG. 10 is a perspective view of a storage tower 510. This storage tower 510 may be used in the automated storage and retrieval systems of FIG. 6 and FIG. 7.

The storage tower 510 comprises a base 514a and a first set of wheels 514b and a second set of wheels 514c. Both the first set of wheels 514b and the second set of wheels 514c are arranged on the base 514a and configured to allow movement of the storage tower 510 in the first direction X and the second direction Y.

The first set of wheels 514b and/or the second set of wheels 514c may be configured for lifting and lowering, so that the first set of wheels 514b and/or the second set of wheels 514c can be engaged with the second rail system 108', at any one time.

The first set of wheels 514b may be arranged to engage with two adjacent rails of the third set of rails 110' on the second rail system 108'. The second set of wheels 514c may be arranged to engage with two adjacent rails of the fourth set of rails 111' of the second rail system 108'.

The first set of wheels 514b and the second set of wheels 514c may be arranged on side plates 517 of the storage tower 510.

The storage tower 510 illustrated in FIG. 10 comprises a framework of upright members 511 and horizontal supports 512. The horizontal supports 512 are distributed vertically with vertical offsets ΔdV to form storage positions for goods holders. The storage positions provided by the horizontal supports 512 are accessible via side openings 516 in the storage tower 510.

The storage tower 510 illustrated in FIG. 10 comprises a top opening 518. The top opening 518 allows the storage tower 510 to receive at least one goods holder from above. The goods holder can be stored and/or retrieved by a container handling vehicle 201,301,401 via an access opening 112 in the first rail system 108.

As illustrated inter alia in FIG. 8, the goods holders do not need to be stored from the bottom up in the storage towers 510. The storage spaces may be populated in any order and with open storage spaces between the populated storage spaces.

Figures 11A, 11B:
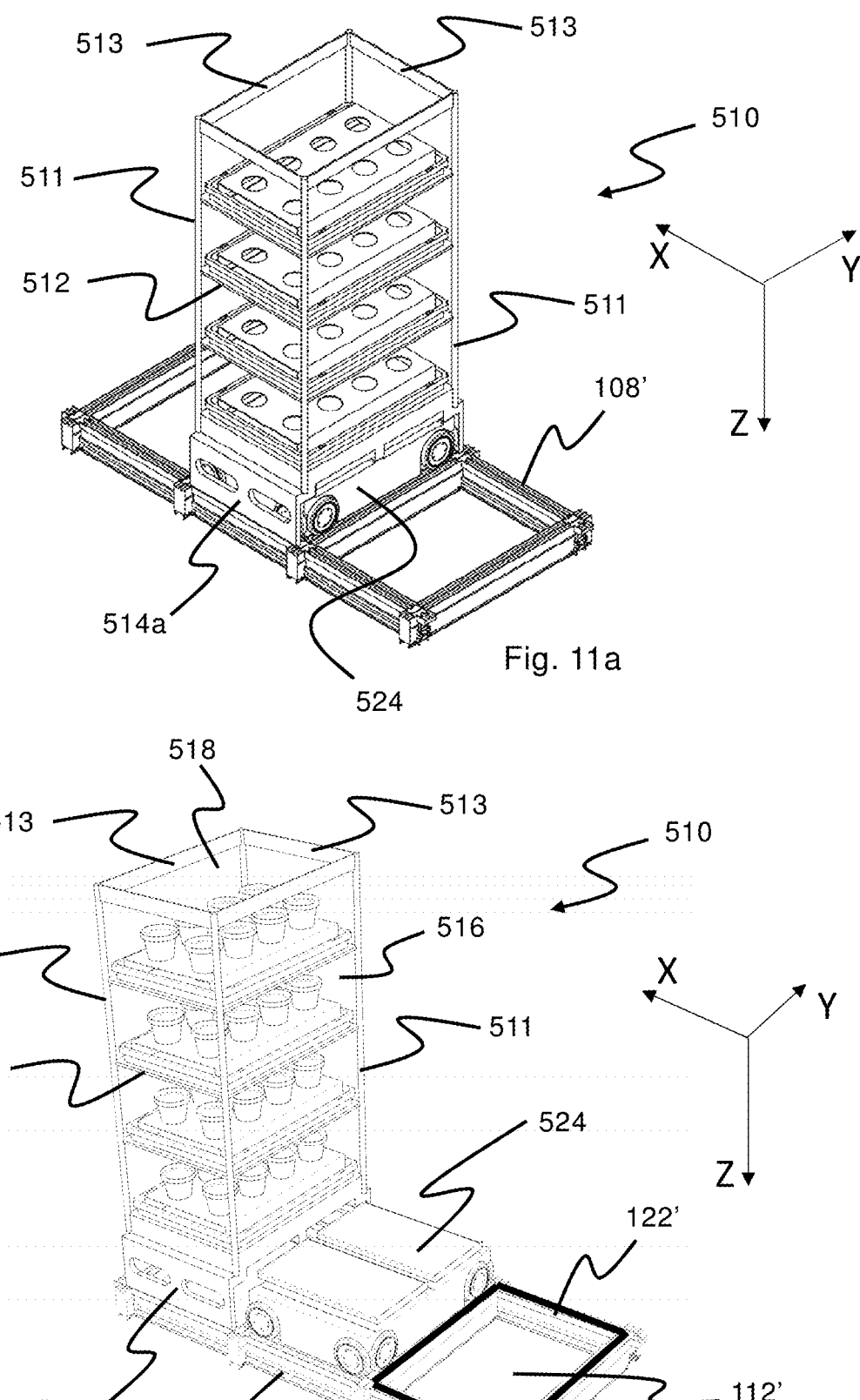
FIG. 11a is a perspective view of a storage tower and a displacement device, wherein the displacement device is accommodated in the base of the storage tower and configured to move the storage tower in at least one of the first direction X and the second direction Y.
FIG. 11b is a perspective view of the storage tower and a displacement device of FIG. 11a, wherein the displacement device is located next to the storage tower.

FIG. 11a is a perspective view of a storage tower 510 and a displacement device 524. This storage tower 510 and the displacement device 524 may be used in the automated storage and retrieval system of FIG. 6 and FIG. 7. The storage tower 510 illustrated in FIG. 11a may also comprise the wheels 515 that are configured for engagement with the underside of the first rail system 108 as illustrated in FIG. 9 and FIG. 10.

As an alternative to being provided with the first set of wheels 514b and the second set of wheels 514c, the base 514a may be configured to accommodate the displacement device 524. The displacement device 524 may be configured to move the storage tower 510 in at least one of the first direction X and the second direction Y.

The displacement device 524 is movable along the drive surface and may comprise an elevation mechanism configured to lift the storage tower 510 off the drive surface.

The displacement device 524 may comprise a first set of wheels and a second set of wheels. Both the first set of wheels 514b and the second set of wheels 514c are configured to allow movement of the displacement device 524 (and thus also the storage tower 510 when lifted) in the first direction X and the second direction Y.

The first set of wheels and/or the second set of wheels of the displacement device 524 may be configured for lifting and lowering, so that the first set of wheels and/or the second set of wheels can be engaged with the second rail system 108', at any one time.

The first set of wheels of the displacement device 524 may be arranged to engage with two adjacent rails of the third set of rails 110' on the second rail system 108'. The second set of wheels of the displacement device 524 may be arranged to engage with two adjacent rails of the fourth set of rails 111' of the second rail system 108'.

As illustrated in FIG. 11a, the framework of the storage tower 510 may also comprise horizontal members 513. These horizontal members 513 may be provided in addition to the horizontal supports 512, or function as the horizontal supports 512.

The goods holders illustrated in FIG. 11a and FIG. 11b are trays for holding pots. These pots may contain plants, e.g. if the automated storage and retrieval system is used for vertical farming.

FIG. 11b is a perspective view of the storage tower 510 and the displacement device 524 of FIG. 11a wherein the displacement device 524 in located next to the storage tower 510.

In FIG. 11b, the base 514a is configured such that the displacement device 524 can enter the base 514a from two sides by means of movement along the first direction X. Alternatively, the base 514a may be configured such that the displacement device 524 can enter the base 514a from two side by means of movement along the second direction Y.

Figures 12A, 12B:
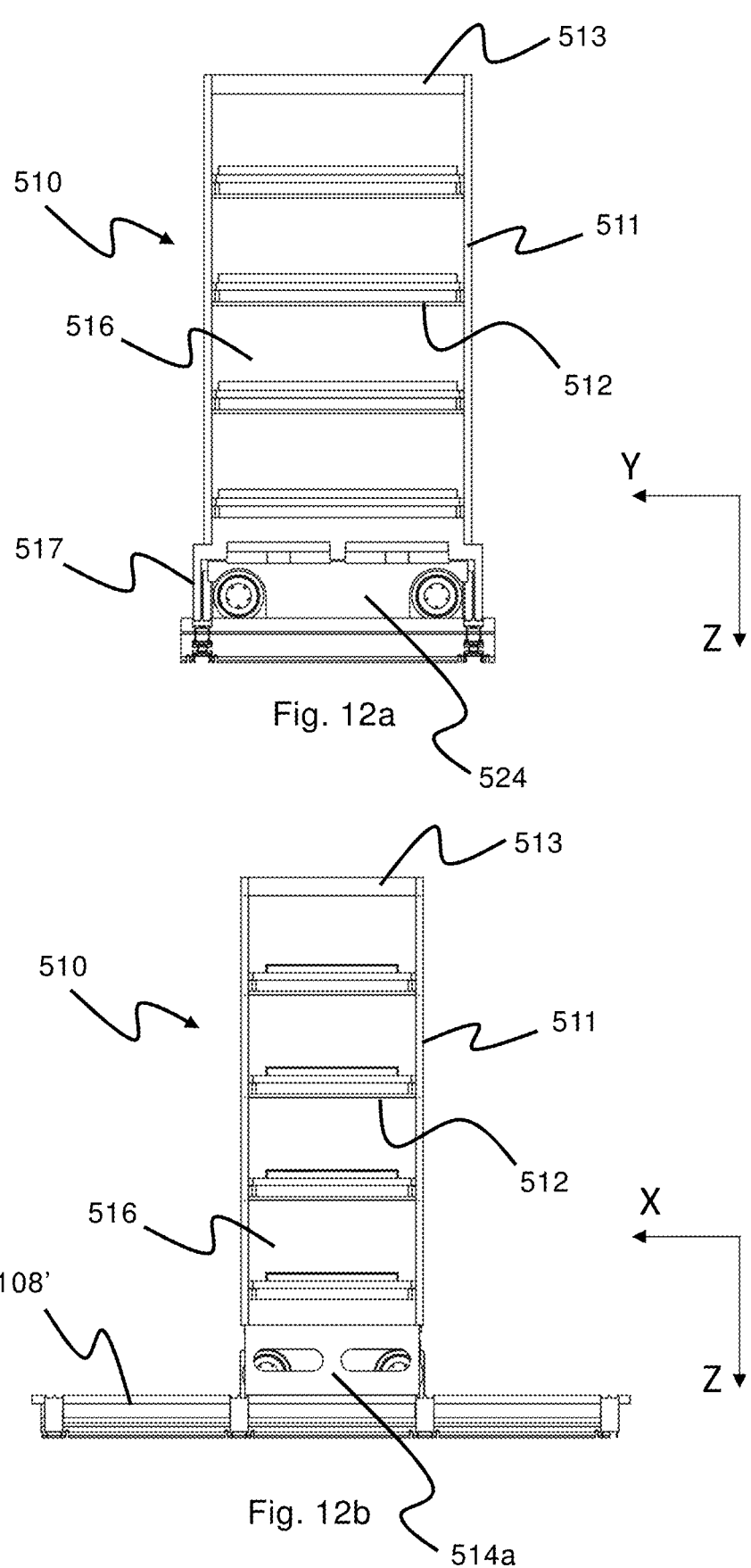

FIG. 12a is a first side view of the storage tower 510 and the displacement device 524 of FIG. 11a.

FIG. 12b is a second side view of the storage tower 510 and the displacement device 524 of FIG. 11a.

Figure 13:
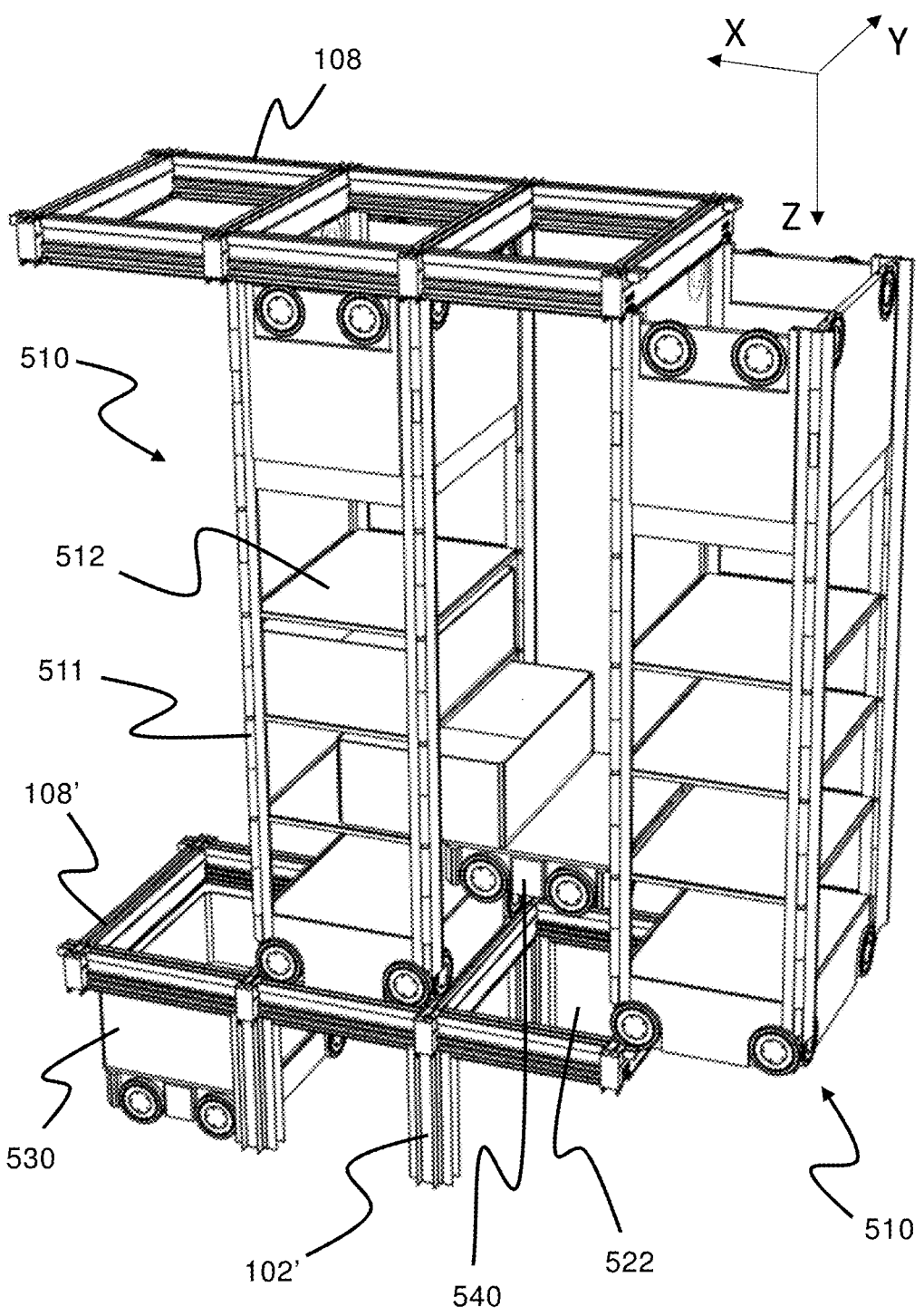
FIG. 13 is a perspective view of two storage towers cooperating with a climbing robot and a remotely operated delivery vehicle, the climbing robot being located in a column void and the remotely operated delivery vehicle being located below the second rail system.

FIG. 13 is a perspective view of a portion of the automated storage and retrieval system. In FIG. 13 it is illustrated how the storage towers 510 may cooperate with other remotely operated robots and vehicles.

In this example, it is illustrated how a climbing robot 540 can climb in the column void 522 to reach any of the storage spaces in the storage tower 510. The exemplified climbing robot 540 of FIG. 13 uses the upright members 511 of the storage towers 510 to climb. The climbing robot 240 may be configured for movement along the second rail system 108' in a similar manner as the storage towers 510. The climbing robot 540 may be configured to carry a goods holder while moving along the second rail system 108' and while climbing the column void 522. The climbing robot 540 may be configured to store and retrieve goods holders via side openings 516 in the storage towers 510.

The upright members 511 of the storage towers 510 may be configured to guide the lifting device 304,404 of the container handling vehicle 201,301,401 when the lifting device 304,404 is moved up and down the column void 522.

At least the target storage tower 510 will be positioned adjacent the column void 522 and may thus guide the lifting device 304,404. Often two or more storage towers 510 will be positioned adjacent the column void 522 and may thus cooperate in guiding the lifting device 304,404.

The horizontal support 512 may be pivotally connected to the storage tower 510 such that it can be moved between a first position and a second position. The horizontal support 512 will then typically be connected to two of the upright members 511 or to one of the horizontal members 513. The horizontal support 512 will typically be movable about a horizontal axis of rotation.

In the first position, the horizontal support 512 may be arranged to provide a storage position in the storage tower 510. The horizontal support 512 will then obstruct vertical movement of the goods holder in the storage tower 510. The horizontal support 512 may be supported by one or several horizontal member(s) 513 in the first position.

In the second position, the horizontal support 512 may be arranged not to obstruct vertical movement of the goods holder in the storage tower 510 such that the goods holder is allowed to move to a different vertical elevation in the storage tower 510.

In the second position, the horizontal support 512 may guide the lifting device 304,404 of the container handling vehicle 201,301,401 in the vertical direction when it is moved through the column void 522, such as to prevent the lifting device 304,404 hooking into one of the horizontal members 513 or one of the other horizontal supports 512 that are in the first position.

The second rail system 108' may have a vertical elevation above the warehouse floor. This may e.g. be achieved with upright members 102' supporting the second rail system 108', as illustrated in FIG. 13.

By elevating the second rail system 108' a second drive surface can be arranged below the second rail system 108'. A remotely operated delivery vehicle 530 may move along this second drive surface in at least one of the first direction X and the second direction Y.

The delivery vehicle 530 may be configured to receive a goods holder from above through an access opening 112' in the second rail system 108'. The delivery vehicle 530 may e.g. receive a goods holder from a container handling vehicle 201,301,401 arranged on the first rail system 108. The delivery vehicle 530 may e.g. deliver a goods holder to a container handling vehicle 201,301,401 arranged on the first rail system 108. The first rail system 108 and the second rail system 108' is preferably vertically aligned as illustrated in FIG. 13.

FIG. 14 is a perspective view of a storage tower 510 with a footprint corresponding to an area of two cells 122,122' of the rail system 108,108' (also referred to as a 1×2 footprint). With this type of storage tower 510, two goods holders may be stored side-by-side in the same storage tower 510. Alternatively, this type of storage tower 510 may allow goods holders of greater size to be stored in the storage tower 510.

The storage tower 510 may have any footprint, however it is preferred that each storage tower 510 has a footprint corresponding to an area of n cells 122, wherein n is an integer of 1 or more.

Figure 15:
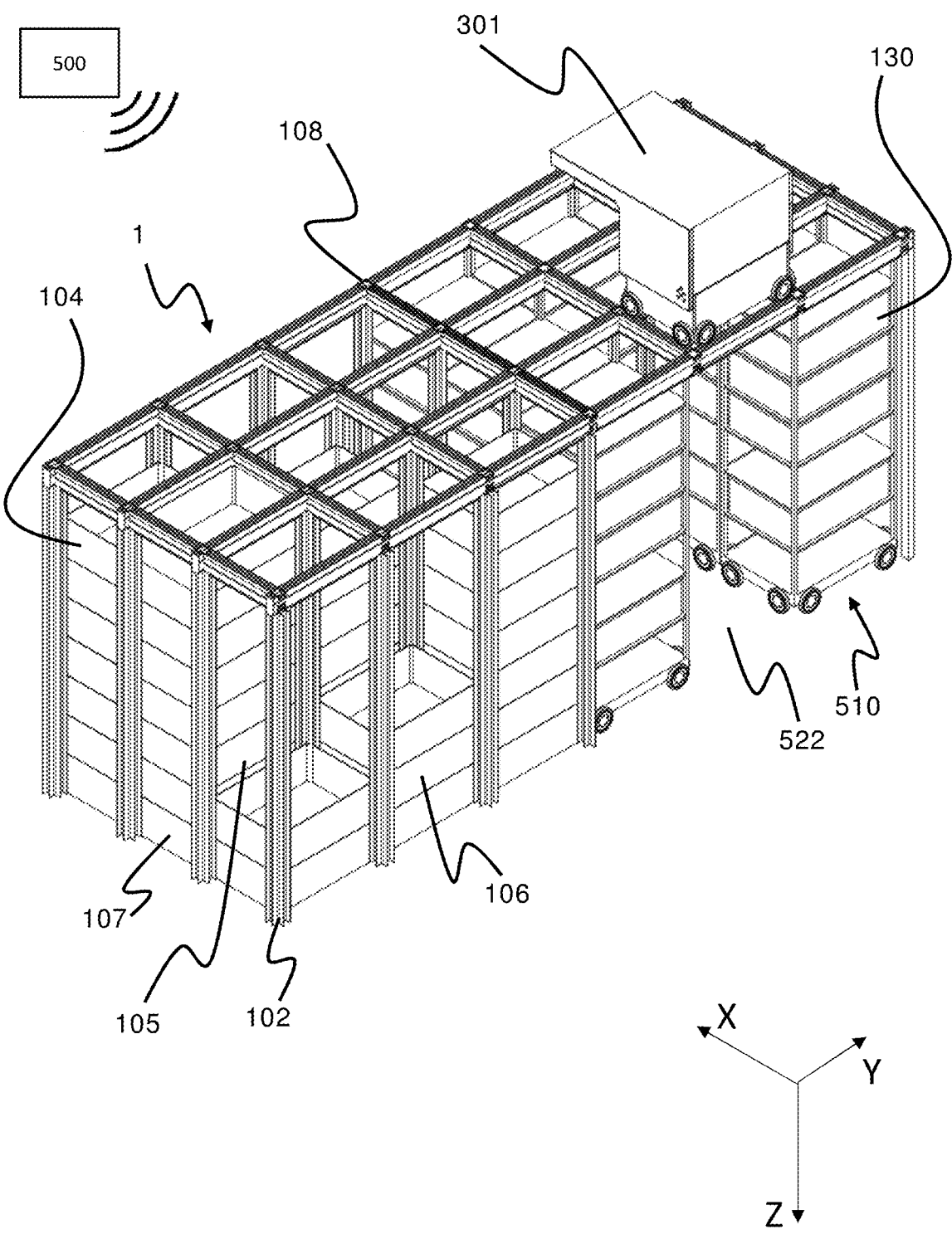
FIG. 15 is a perspective view of the automated storage and retrieval system according to the invention connected to a prior art automated storage and retrieval system.

FIG. 15 is a perspective view of an automated storage and retrieval system comprising a prior art storage grid 104. The storage grid 104 and the storage section 130 are both located beneath the first rail system 108, such that the same container handling vehicle 301 may access both the storage grid 104 and the storage section 130.

The storage grid 104 comprises storage columns 105, each located beneath an access opening 112 of the first rail system 108. A plurality of goods holders may be arranged in stacks 107 in each storage column 105.

In the illustrated example of FIG. 15, the goods holders are storage containers 106 that can be stored in both the storage columns 105 and in the storage towers 510.

The automated storage and retrieval system may be split in two parts, wherein the first part (the storage grid 104) has storage columns 105 and the second part (the storage section 130) has storage towers 510. The two parts may provide different advantages to the automated storage and retrieval system. The storage grid 104 may serve as a low runner storage and the storage section 130 may serve as a high runner storage. As an example, the high runner storage may store goods holders containing orders having been picked which are ready for delivery, whereas the low runner storage may store goods holders containing product items to be picked. As another example, the storage grid 104 and the storage section 130 may be configured for different climate zones, such as temperature, humidity, and lighting. One of the parts may e.g. be a cold storage.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Prior art automated storage and retrieval system
14 Lifting device
17 Base part
18 Lifting bands
19 Telescopic part
20 Grippers
100 Framework structure
102 Upright members of framework structure
102' Upright members for the second rail system
104 Storage grid
105 Storage column
106 Storage container
106' Particular position of storage container
107 Stack
108 Rail system
108' Second rail system
110 First set of parallel rails, directed in first direction (X)
110' Third set of parallel rails, directed in first direction (X)
111 Second set of parallel rails, directed in second direction (Y)
111' Fourth set of parallel rails, directed in second direction (Y)

112 Access opening in the first rail system
112' Access opening in the second rail system
119 First port column
120 Second port column
122 Cell of the first rail system
122' Cell of the second rail system
130 Storage section
201 Prior art container handling vehicle
201a Vehicle body of the container handling vehicle 201
201b First set of wheels in first direction (X)
201c Second set of wheels in second direction (Y)
301 Prior art cantilever container handling vehicle
301a Vehicle body of the container handling vehicle 301
301b First set of wheels in first direction (X)
301c Second set of wheels in second direction (Y)
304 Lifting device
401 Prior art container handling vehicle
401a Vehicle body of the container handling vehicle 401
401b First set of wheels in first direction (X)
401c Second set of wheels in second direction (Y)
404 Lifting device
510 Storage tower
511 Upright member of the storage tower
512 Horizontal support for goods holder
513 Horizontal member of the storage tower
514a Base
514b First set of wheels in first direction (X)
514c Second set of wheels in second direction (Y)
515 Wheels
516 Side opening
517 Side plate
518 Top opening
522 Column void
524 Displacement device
530 Remotely operated delivery vehicle
540 Climbing robot
X First direction
Y Second direction
Z Third direction
ΔdV Vertical offset

The invention claimed is:

1. An automated storage and retrieval system comprising:
a rail system comprising a first set of parallel rails arranged in a horizontal plane and extending in a first direction and a second set of parallel rails arranged in the horizontal plane and extending in a second direction which is orthogonal to the first direction, the first set of parallel rails and the second set of parallel of rails form a grid in the horizontal plane comprising a plurality of adjacent cells, wherein each of the cells comprises an access opening; and
a storage section located beneath or above the rail system, wherein storage positions in the storage section are accessible through the access openings of the rail system;
wherein the storage section comprises a plurality of storage towers for storing goods holders and configured for movement in at least one of the first direction and the second direction, and at least one column void defined by a space between two or more of the plurality of storage towers, the at least one column void having a footprint corresponding to an area of at least one cell; and
wherein the at least one column void can be repositioned within the storage section into vertical alignment with different access openings via movement in at least one of the first direction and the second direction of at least one of the plurality of storage towers.

2. The system according to claim 1,
wherein each storage tower has a footprint corresponding to an area of n cells, and
wherein n is an integer of 1 or more.

3. The system according to claim 1, wherein each storage tower comprises a framework of upright members and horizontal supports distributed vertically with vertical offsets for supporting goods holders in storage positions.

4. The system according to claim 3, wherein each horizontal support is pivotably connected to the storage tower and movable between:
a first position, wherein the horizontal support is arranged to obstruct vertical movement of the goods holder in the storage tower such that a storage position is provided; and
a second position, wherein the horizontal support is arranged not to obstruct vertical movement of the goods holder in the storage tower such that the goods holder is allowed to move to a different vertical elevation in the storage tower.

5. The system according to claim 1,
wherein each storage tower comprises drive means configured to drive the storage tower in at least one of the first direction and the second direction; or
wherein the system comprises a displacement device configured to displace the storage tower in at least one of the first direction and the second direction.

6. The system according to claim 1, wherein the system further comprises:
a control system configured to monitor and control movements of the plurality of storage towers.

7. The system according to claim 1,
wherein each storage tower comprises a side opening and an adjustable blocker for obstructing the side opening; and
wherein the blocker comprises a vertical surface for guiding a lifting device of a container handling vehicle over the side opening, and the blocker is movable between:
a first position, wherein the vertical guiding surface is positioned to guide the lifting device and obstruct horizontal movement of the goods holder through the side opening; and
a second position, wherein the vertical guiding surface is positioned not to guide the lifting device and allow horizontal movement of a storage container through the side opening.

8. The system according to claim 1, wherein at least one storage tower can move outside of the storage section.

9. The system according to claim 1, wherein the system is configured to provide a predetermined climate zone.

10. The system according to claim 1, wherein the automated storage and retrieval system further comprises:
a plurality of goods holders arranged in the storage section.

11. The system according to claim 1,
wherein the storage section is located beneath the rail system; and
wherein the automated storage and retrieval system further comprises:
a container handling vehicle comprising a lifting device for lifting goods holders and drive means configured to drive the container handling vehicle along the rail system in at least one of the first direction and the second direction.

12. The system according to claim 11, wherein the lifting device comprises a telescopic part for sideways entry of the lifting device into the storage tower.

13. The system according to claim 11, wherein the rail system is a first rail system and the automated storage and retrieval system further comprises a second rail system arranged in a second horizontal plane below the storage section;

wherein the second rail system comprises a third set of parallel rails vertically aligned with the first set of parallel rails of the first rail system, and a fourth set of parallel rails vertically aligned with the second set of parallel rails of the first rail system; and wherein each storage tower is configured for movement along the second rail system.

14. The system according to claim 11, wherein the plurality of storage towers comprises wheels which are configured for engagement with an underside of the first rail system.

15. The system according to claim 14, wherein the underside of the first rail system is provided with tracks for guiding storage towers in the first direction and the second direction.

16. The system according to claim 11, wherein at least one storage tower is configured to receive at least one goods holder from above via an access opening.

17. The system according to claim 11, wherein the system further comprises a plurality of stacks of storage containers arranged in storage columns that are each located beneath an access opening of the first rail system.

18. A method for storing and retrieving a goods holder using an automated storage and retrieval system, wherein the automated storage and retrieval system comprises:

a rail system comprising a first set of parallel rails arranged in a horizontal plane and extending in a first direction and a second set of parallel rails arranged in the horizontal plane and extending in a second direction which is orthogonal to the first direction, the first set of parallel rails and the second set of parallel of rails form a grid in the horizontal plane comprising a plurality of adjacent cells, wherein each of the cells comprises an access opening; and a storage section comprising:

storage positions that are accessible through the access openings of the rail system;

a plurality of storage towers for storing goods holders and configured for movement in at least one of the first direction and the second direction; and at least one column void defined by a space between two or more of the plurality of storage towers, the at least one column void having a footprint corresponding to an area of at least one cell;

wherein the at least one column void can be repositioned within the storage section into vertical alignment with different access openings via movement in at least one of the first direction and the second direction of at least one of the plurality of storage towers;

wherein the storage section is located beneath the rail system;

wherein the automated storage and retrieval system further comprises:

a plurality of goods holders arranged in the storage section; and a container handling vehicle comprising a lifting device for lifting goods holders and drive means configured to drive the vehicle along the rail system in at least one of the first direction and the second direction; and wherein the method comprising:

moving one or more storage towers in the first direction and the second direction to reposition the at least one column void into vertical alignment with a first access opening of the rail system and adjacent the storage tower in which a target goods holder is stored or is to be stored;

moving the container handling vehicle to the first access opening;

lowering the lifting device of the container handling vehicle into the first column void via the first access opening; and retrieving or storing the target goods holder by means of the lifting device.

19. The method according to claim 18, further comprising:

moving one or more storage tower in the first direction and the second direction to arrange the one or more storage tower at a peripheral area of the storage section; and collecting the one or more storage tower for transport to another facility.

20. The method according to claim 18, further comprising:

moving one or more storage towers in the first direction and the second direction to provide the at least one column void at a peripheral area of the storage section such that a passage is provided to the storage section from an outside of the storage section.

* * * * *